(12) United States Patent
Hayashi

(10) Patent No.: US 8,427,409 B2
(45) Date of Patent: Apr. 23, 2013

(54) PROJECTOR

(75) Inventor: Daisuke Hayashi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 1425 days.

(21) Appl. No.: 12/079,539

(22) Filed: Mar. 27, 2008

(65) Prior Publication Data

US 2008/0239173 A1 Oct. 2, 2008

(30) Foreign Application Priority Data

Mar. 28, 2007 (JP) ................. 2007-083703
Jan. 7, 2008 (JP) ................. 2008-000370
Mar. 26, 2008 (JP) ................. 2008-079944

(51) Int. Cl.
*G09G 3/36* (2006.01)

(52) U.S. Cl.
USPC ............................... 345/87; 349/8

(58) Field of Classification Search .......... None
See application file for complete search history.

(56) References Cited

U.S. PATENT DOCUMENTS

| | | | | |
|---|---|---|---|---|
| 5,434,690 A * | 7/1995 | Hisatake et al. | ............ | 349/8 |
| 6,342,897 B1 * | 1/2002 | Wen | ............ | 345/589 |
| 6,536,901 B2 * | 3/2003 | Takezawa et al. | ............ | 353/20 |
| 6,829,025 B2 * | 12/2004 | Sakamoto | ............ | 349/114 |
| 7,551,280 B2 * | 6/2009 | Yanai et al. | ............ | 356/364 |
| 2005/0012870 A1 * | 1/2005 | Hirata et al. | ............ | 349/8 |
| 2005/0099813 A1 * | 5/2005 | Hashizume | ............ | 362/261 |
| 2005/0231662 A1 * | 10/2005 | Isozaki et al. | ............ | 349/113 |
| 2005/0248736 A1 * | 11/2005 | Itoh | ............ | 353/102 |
| 2005/0270449 A1 * | 12/2005 | Koma et al. | ............ | 349/114 |
| 2006/0250548 A1 * | 11/2006 | Yasukawa | ............ | 349/113 |
| 2007/0002191 A1 * | 1/2007 | Hashizume et al. | ............ | 349/5 |
| 2007/0189016 A1 * | 8/2007 | Yamauchi et al. | ............ | 362/341 |
| 2007/0216829 A1 * | 9/2007 | Sumiyoshi et al. | ............ | 349/74 |
| 2008/0094515 A1 * | 4/2008 | Gutta et al. | ............ | 348/602 |
| 2009/0244412 A1 * | 10/2009 | Tsukagoshi | ............ | 349/8 |
| 2011/0090442 A1 * | 4/2011 | Koma et al. | ............ | 349/123 |

FOREIGN PATENT DOCUMENTS

| | | |
|---|---|---|
| JP | 06-148672 | 5/1994 |
| JP | 08-160377 | 6/1996 |
| JP | 10-090521 | 4/1998 |
| JP | 2000-010048 | 1/2000 |
| JP | 2000-347158 | 12/2000 |
| JP | 2003-131320 | 5/2003 |
| JP | 2003-233069 A | 8/2003 |
| JP | 2005-284265 A | 10/2005 |

* cited by examiner

*Primary Examiner* — Alexander S Beck
*Assistant Examiner* — Sejoon Ahn
(74) *Attorney, Agent, or Firm* — ALG Intellectual Property, LLC

(57) ABSTRACT

A projector includes an illumination device that emits an illumination light flux, a color-separating optical system that separates light from the illumination device into plural color lights and directs the color lights to an illuminated area, and a plurality of liquid crystal light valves that have liquid crystal panels. The crystal light valves are configured to maximize light utilization efficiency.

12 Claims, 8 Drawing Sheets

PROJECTOR

CROSS REFERENCE TO RELATED APPLICATIONS

The present application claims priority and incorporates by reference in their entirety Japanese Patent Application No. 2007-083703 filed Mar. 28, 2007, Japanese Patent Application No. 2008-000370 filed Jan. 7, 2008, and Japanese Patent Application No. 2008-079944 filed Mar. 26, 2008.

BACKGROUND

Within the projection industry improvements in light utilization efficiency are desired among projectors having plural liquid crystal light valves which include liquid crystal panels. Projectors using liquid crystal panels of either normally white systems or normally black systems may benefit from improved light utilization efficiency.

The liquid crystal panel of the normally white system may refer to a liquid crystal panel exhibiting maximum light transmittance without applying voltage to the liquid crystal panel when the projector displays a white image on a screen. For example, a projector with a TN type liquid crystal panel, a normally white system, and emission-side polarizers as referred to in Japanese Patent Publication No. JP-A-2003-131320.

The liquid crystal panel of the normally black system may refer to a liquid crystal panel exhibiting minimum light transmittance without applying voltage to the liquid crystal panel when the projector displays a black image on a screen. For example, a projector using plural liquid crystal panels of a VA (Vertical Alignment) type and a normally black system.

SUMMARY

A projector configured to improve light utilization efficiency is described. At least one embodiment of the projector includes plural liquid crystal panels of the TN type and the normally white system. Various other embodiments provide a projector configured to improve light utilization efficiency including plural liquid crystal panels of the VA type and the normally black system.

Light utilization efficiency is often reduced because wavelength regions of light where light transmittance of each of liquid crystal light valves arranged in optical paths of respective color lights are maximized in a voltage OFF state, in which no voltage is applied to liquid crystal panels is present near a wavelength region of green light with the emphasis on brightness.

In this specification, "light transmittance of a liquid crystal light valve" refers to a ratio of light emitted from the liquid crystal light valve to light made incident on the liquid crystal light valve.

FIG. 7 is a diagram for describing challenges in at least one embodiment of the projector. In FIG. 7, polarization states of light (linear polarized light, elliptical polarized light, and circular polarized light) made incident on liquid crystal panels of respective liquid crystal light valves in a voltage OFF state, where no voltage is applied to the liquid crystal panels, are schematically shown.

In the typical projector, including those projectors having plural liquid crystal panels of the TN type and the normally white system, liquid crystal light valves of the same type are used for each color light (e.g., red light, green light, blue light). Unfortunately, the traditional liquid crystal light valves are formed such that light transmittance of the liquid crystal light valves is maximized in a wavelength region between blue light and green light in a voltage OFF state in which no voltage is applied to the liquid crystal panels.

In this case, there is a wavelength difference ($\Delta R$) between wavelength regions ($\lambda R$, $\lambda C$; $\lambda B$) of color lights modulated by the respective liquid crystal light valves and a wavelength region ($\lambda A$) where light transmittance of the liquid crystal light valves is maximized when the liquid crystal light panels are in the voltage OFF state. Therefore, as shown in FIG. 7, concerning the blue light, a polarization axis of light is excessively rotated 90 degree or more. On the other hand, concerning the green light and the red light, the rotation of polarization axes of light is insufficient. These are due to the differences in index of refraction among the blue light, green light and red light. Therefore, when the liquid crystal panels of the respective liquid crystal light valves are brought into the voltage OFF state, light is lost in all the color lights of the red light, the green light, and the blue light and light utilization efficiency falls. In particular, concerning the red light, since the wavelength difference ($\Delta \lambda$) is larger than those of the other color lights, the loss of light in the voltage OFF state of the liquid crystal panel is larger. As a result, light utilization efficiency of the red light falls to be lower than light utilization efficiency of the other color lights.

When a projector displays an image with highest luminance, a predetermined bias voltage is applied to liquid crystal panels of liquid crystal light valves formed such that the wavelength region of light ($\lambda A$) where light transmittance of the liquid crystal light valves is maximized in a voltage OFF state, in which no voltage is applied to the liquid crystal panels, is present further on a long wave length side than the wavelength regions ($\lambda R$, $\lambda G$, $\lambda B$) of color lights on the optical paths on which the liquid crystal light valves are arranged. Then, it is possible to reset the polarization axis of light excessively rotated 90 degrees or more and bring the light transmittance in the wavelength region of color light on the optical path on which the correspond liquid crystal light valve is arranged closer to maximum or uniform the light transmittances of the liquid crystal light valves arranged on the corresponding optical paths of color lights of the wavelength regions ($\lambda R$, $\lambda G$, $\lambda B$).

In some case, the plural liquid crystal light valves are liquid crystal light valves formed such that the wavelength region ($\lambda A$) is present further on a long wavelength side than the wavelength regions ($\lambda R$, $\lambda G$, $\lambda B$). In this case, if the predetermined bias voltage is applied to the liquid crystal light valves, it is possible to reset the polarization axis of light excessively rotated 90 degrees or more and bring the light transmittance in the wavelength region of color light on the optical path on which the correspond liquid crystal light valve is arranged closer to maximum or uniform the light transmittances of the liquid crystal light valves arranged on the corresponding optical paths of color lights of the wavelength regions ($\lambda R$, $\lambda G$, $\lambda B$). As such, in various embodiments, it is possible to reduce or eliminate the difference between the light transmittance in the wavelength region ($\lambda A$) of the liquid crystal light valve in the voltage OFF state and the light transmittance in the wavelength regions ($\lambda R$, $\lambda G$, $\lambda B$) of corresponding color lights on the optical path on which the liquid crystal light valves in the predetermined bias voltage state, in which the second voltage is applied to the liquid crystal light panel are arranged. Therefore, it is possible to control the occurrence of loss of light and control the fall in light utilization efficiency.

In one embodiment, when (1) liquid crystal light valves formed such that the wavelength region ($\lambda A$) is present in wavelength regions same as the wavelength regions ($\lambda R$, $\lambda G$, λB) or present further on the long wavelength side than the wavelength regions (λR, λG, λB) are arranged in the optical paths of the respective color lights and (2) when the projector displays an image with highest luminance, the predetermined bias voltage is applied to the liquid crystal panels of the liquid crystal light valves formed such that the wavelength region (λA) is present further on the long wavelength side than the wavelength regions (λR, λG, λB), as a result, it is possible to further improve light utilization efficiency.

According to an embodiment, there is provided a projector including an illumination device that emits an illumination light flux, a color-separating optical system that separates light from the illumination device into plural color lights and leads the color lights to an illuminated area, plural liquid crystal light valves that have liquid crystal panels of a TN type and a normally white system and emission-side polarizers arranged on light emission sides of the liquid crystal panels and modulate the plural color lights led by the color-separating optical system according to image information, respectively, a color-combining optical system that combines the respective color lights modulated by the plural liquid crystal light valves, a projection optical system that projects image light combined by the color-combining optical system, and a liquid-crystal driving device that controls driving of the plural liquid crystal light valves. Each of the plural liquid crystal light valves is formed such that a wavelength region of light where light transmittance of the liquid crystal light valve is maximized in a voltage OFF state, in which no voltage is applied to the liquid crystal panel, is present in a wavelength region same as a wavelength region of color light on an optical path on which the liquid crystal light valve is arranged or is present further on a long wavelength side than the wavelength region. The projector further includes a voltage applying device that applies, when the projector displays an image with highest luminance, a predetermined bias voltage to the liquid crystal panel of the liquid crystal light valve formed such that a wavelength region of light where light transmittance of the liquid crystal light valve is maximized in the voltage OFF state is present further on the long wavelength side than a wavelength region of color light on an optical path on which the liquid crystal light valve is arranged among the plural liquid crystal light valves.

According to an embodiment, there is provided a projector comprising an illumination device configured to emit an illumination light flux; a color-separating optical system configured to separate light from the illumination device into plural color lights and configured to lead the separated plural color lights to an illuminated area; plural liquid crystal light valves having liquid crystal panels of a TN type and a normally white system and emission-side polarizers arranged on light emission sides of the liquid crystal panels, each of the plural liquid crystal light valves: configured to modulate one of the respective plural color lights received from the color-separating optical system in accordance with image information, and configured to have a wavelength region where a light transmittance of the liquid crystal light valve is maximized in a voltage OFF state when no voltage is applied to the liquid crystal panel, the wavelength region being located in at least one of: (a) a color light wavelength region having a wavelength of the color light modulated by the liquid crystal light valve, and (b) a long wavelength region having a wavelength greater than the color light wavelength region; a color-combining optical system configured to combine the respective plural color lights modulated by the plural liquid crystal light valves into image light; a projection optical system configured to project the image light; a liquid-crystal driving device configured to control the plural liquid crystal light valves; and a voltage applying device configured to apply, when the projector displays an image with a highest luminance, a predetermined bias voltage to at least one of the liquid crystal panels having the long wavelength region so that the light transmittance of the color light modulated by the corresponding liquid crystal light valve draw closer to the maximum.

In the projector according to the embodiment, the plural liquid crystal light valves are formed such that (1) the wavelength region of light (λA) where light transmittance of the liquid crystal light valve is maximized in the voltage OFF state, in which no voltage is applied to the liquid crystal panels, is present in wavelength regions same as the wavelength region (λR, λG, λB) of color lights on optical paths on which the liquid crystal light valves are arranged or is present further on a long wavelength side than the wavelength regions and (2) the projector includes the voltage applying device. Therefore, it is possible to bring the light transmittance in the wavelength region of color light on the optical path on which the correspond liquid crystal light valve is arranged closer to maximum or uniform the light transmittances of the liquid crystal light valves arranged on the corresponding optical paths of color lights of the wavelength regions (λR, λG, λB) when the voltage applying device applies the predetermined bias voltage to the liquid crystal panels of the liquid crystal light valves formed such that the wavelength region (λA) is present further on the long wavelength side than the wavelength regions (λR, λG, λB). As a result, it is possible to reduce or eliminate the difference between the light transmittance in the wavelength region (λA) of the liquid crystal light valve in the voltage OFF state and the light transmittance in the wavelength regions (λR, λG, λB) corresponding to color lights on optical paths on which the liquid crystal light valves in the predetermined bias voltage state when the predetermined bias voltage is applied to the liquid crystal panel. Therefore, it is possible to control the occurrence of loss of light in the liquid crystal light valve and control the fall in light utilization efficiency.

Therefore, the projector according to the embodiment is a projector including plural liquid crystal panels of the TN type and the normally white system, wherein the projector can further improve light utilization efficiency.

In recent years, there are rapidly increasing demands for home projectors for enjoying movies and the like in homes. In such home projectors, since it is important to improve reproducibility of dark scenes and smoothly reproduce human skin colors, it is preferable that color temperature is low and a chromaticity coordinates of a projected white image is close to a black body locus. However, in the projector in the past including plural liquid crystal panels of the TN type and the normally white system, since light utilization efficiency of the red light is low as described above, it is difficult to reduce the color temperature while maintaining brightness and bring the chromaticity coordinates of the projected white image closer to the black body locus.

On the other hand, with the projector configured according to at least one embodiment, it is possible to improve light utilization efficiency of the red light as described above. Therefore, it is possible to reduce the color temperature while maintaining brightness and bring the chromaticity coordinates of the projected white image closer to the black body locus. As a result, the projector according to at least one embodiment is particularly effective for the home projectors for enjoying movies and the like in homes.

In the projector according to various embodiments, it is preferable that the plural liquid crystal light valves are formed such that a wavelength region of light where light transmittance of the liquid crystal light valves is maximized in a voltage OFF state, in which no voltage is applied to the liquid crystal panels, is present in a wavelength region same as a wavelength region of color light having a largest wavelength among the plural color lights separated by the color-separating optical system. As such, in various embodiments, it is possible to form all the liquid crystal light valves in the same structure. Therefore, it is possible to reduce cost in manufacturing the projector.

In the projector in the past including plural liquid crystal panels of the VA type and the normally black system, improvement of light utilization efficiency is often prevented because liquid crystal light valves arranged in optical paths of respective color lights are formed such that a wavelength region of light where light transmittance of the liquid crystal light valves is maximized in a voltage ON state, in which a voltage is applied to liquid crystal panels, is present in a wavelength region between blue light and green light.

FIG. 8 is a diagram for describing a problem in the projector in the past. In FIG. 8, polarization states of light (linear polarized light, elliptical polarized light, and circular polarized light) made incident on liquid crystal panels of respective liquid crystal light valves in the voltage ON state, in which a predetermined first voltage is applied to the liquid crystal panels, are schematically shown.

In the projector in the past including plural liquid crystal panels of the VA type and the normally black system, as a liquid crystal light valve for red light, a liquid crystal light valve for green light, and a liquid crystal light valve for blue light, liquid crystal light valves of the same type are used. The liquid crystal light valves are formed such that light transmittance of the liquid crystal light valves is maximized in a wavelength region between blue light and green light in the voltage ON state in which a voltage is applied to the liquid crystal panels.

In this case, there is a wavelength difference ($\Delta\lambda$) between wavelength regions ($\lambda R$, $\lambda G$; $\lambda B$) of color lights modulated by the respective liquid crystal light valves and a wavelength region ($\lambda A$) where light transmittance of the liquid crystal light valves is maximized when the liquid crystal panels are in the voltage ON state. Therefore, as shown in FIG. 8, concerning the blue light, a polarization axis of light is excessively rotated 90 degree or more. On the other hand, concerning the green light and the red light, the rotation of polarization axes of light is insufficient. These are due to the differences in index of refraction among the blue light, green light and red light. Therefore, when the liquid crystal panels of the respective liquid crystal light valves are brought into the voltage ON state, light is lost in all the color lights of the red light, the green light, and the blue light and light utilization efficiency falls. In particular, concerning the red light, since the wavelength difference ($\Delta\lambda$) is larger than those of the other color lights, the loss of light in the voltage ON state of the liquid crystal panel is larger. As a result, light utilization efficiency of the red light falls to be lower than light utilization efficiency of the other color lights.

In one embodiment, when a projector displays an image with highest luminance, a predetermined second voltage lower than the predetermined first voltage is applied to liquid crystal panels of liquid crystal light valves formed such that the wavelength region of light ($\lambda A$) where light transmittance of the liquid crystal light valves is maximized in the voltage ON state, in which the first voltage is applied to the liquid crystal panels, is present further on a long wave length side than the wavelength regions ($\lambda R$, $\lambda G$, $\lambda B$) of color lights on the optical paths on which the liquid crystal light valves are arranged. Then, it is possible to reset the polarization axis of light excessively rotated 90 degrees or more and bring the light transmittance in the wavelength region of color light on the optical path on which the correspond liquid crystal light valve is arranged closer to maximum or uniform the light transmittances of the liquid crystal light valves arranged on the corresponding optical paths of color lights of the wavelength regions ($\lambda R$, $\lambda G$, $\lambda B$).

In some case, the plural liquid crystal light valves are liquid crystal light valves formed such that the wavelength region ($\lambda A$) is present further on the long wavelength side than the wavelength regions ($\lambda R$, $\lambda G$, $\lambda B$). In this case, if the second voltage lower than the first voltage is applied to the liquid crystal light valves, it is possible to reset the polarization axis of light excessively rotated 90 degrees or more and bring the light transmittance in the wavelength region of color light on the optical path on which the correspond liquid crystal light valve is arranged closer to maximum or uniform the light transmittances of the liquid crystal light valves arranged on the corresponding optical paths of color lights of the wavelength regions ($\lambda R$, $\lambda G$, $\lambda B$). As such, in various embodiments, it is possible to reduce or eliminate the difference between the light transmittance in the wavelength region ($\lambda A$) of the liquid crystal light valve in the voltage ON state, in which the first voltage is applied to the liquid crystal panels and the light transmittance in the wavelength regions ($\lambda R$, $\lambda G$, $\lambda B$) of corresponding color lights on the optical path on which the liquid crystal light valves in the second voltage state, in which the second voltage is applied to the liquid crystal panels are arranged. Therefore, it is possible to control the occurrence of loss of light and control the fall in light utilization efficiency.

When (1) liquid crystal light valves formed such that the wavelength region ($\lambda A$) is present in wavelength regions same as the wavelength regions ($\lambda R$, $\lambda G$, $\lambda B$) or present further on the long wavelength side than the wavelength regions ($\lambda R$, $\lambda G$, $\lambda B$) are arranged in the optical paths of the respective color lights and (2) when the projector displays an image with highest luminance, the second voltage lower than the first voltage is applied to the liquid crystal panels of the liquid crystal light valves formed such that the wavelength region ($\lambda A$) is present further on the long wavelength side than the wavelength regions ($\lambda R$, $\lambda G$, $\lambda B$), as a result, it is possible to further improve light utilization efficiency.

According to another embodiment, there is provided a projector including an illumination device that emits an illumination light flux, a color-separating optical system that separates light from the illumination device into plural color lights and leads the color lights to an illuminated area, plural liquid crystal light valves that have liquid crystal panels of a VA type and a normally black system and emission-side polarizers arranged on light emission sides of the liquid crystal panels and modulate the plural color lights led by the color-separating optical system according to image information, respectively, a color-combining optical system that combines the respective color lights modulated by the plural liquid crystal light valves, a projection optical system that projects image light combined by the color-combining optical system, and a liquid-crystal driving device that controls driving of the plural liquid crystal light valves. Each of the plural liquid crystal light valves is formed such that a wavelength region of light where light transmittance of the liquid crystal light valve is maximized in a voltage ON state, in which a predetermined first voltage is applied to the liquid crystal panel, is present in a wavelength region same as a wavelength region of color light on an optical path on which the liquid crystal light valve is arranged or is present further on a long wavelength side than the wavelength regions. The projector further includes a voltage applying device that applies, when the projector displays an image with highest luminance, a predetermined second voltage lower than the first voltage to the liquid crystal panel of the liquid crystal light valve formed such that a wavelength region of light where light transmittance of the liquid crystal light valve is maximized in the voltage ON state is present further on the long wavelength side than a wavelength region of color light on an optical path on which the liquid crystal light valve is arranged among the plural liquid crystal light valves.

According to certain embodiments there is provided a projector comprising: an illumination device configured to emit an illumination light flux; a color-separating optical system configured to separate light from the illumination device into plural color lights and configured to lead the separated plural color lights to an illuminated area; plural liquid crystal light valves having liquid crystal panels of a VA type and a normally black system and emission-side polarizers arranged on light emission sides of the liquid crystal panels, each of the plural liquid crystal light valves: configured to modulate the one of the respective plural color lights received from the color-separating optical system in accordance with image information, and configured to have a wavelength region where a light transmittance of the liquid crystal light valve is maximized in a voltage ON state when a predetermined first voltage is applied to the liquid crystal panel, the wavelength region being located in at least one of: (a) a color light wavelength region having a wavelength of the color light modulated by the liquid crystal light valve, and (b) a long wavelength region having a wavelength greater than the color light wavelength region; a color-combining optical system configured to combine the respective plural color lights modulated by the plural liquid crystal light valves into image light; a projection optical system configured to project the image light; and a liquid-crystal driving device configured to control the plural liquid crystal light valves, wherein the liquid-crystal driving device is configured to apply, a predetermined second voltage lower than the predetermined first voltage to at least one of the liquid crystal panels having the long wavelength region when the projector displays an image with a highest luminance so that the light transmittance of the color light modulated by the corresponding liquid crystal light valve draw closer to maximum.

In the projector according to the embodiment, the plural liquid crystal light valves are formed such that (1) the wavelength region of light (λA) where light transmittance of the liquid crystal light valves is maximized in the voltage ON state, in which the first predetermined first voltage is applied to the liquid crystal panels, is present in wavelength regions same as the wavelength regions (λR, λC, λB) of color lights on optical paths on which the liquid crystal light valves are arranged or is present further on a long wavelength side than the wavelength regions and (2) the projector includes the voltage applying device. Therefore, it is possible to bring the light transmittance of the wavelength region of color light on the optical path on which the correspond liquid crystal light valve is arranged closer to maximum or uniform the light transmittances of the liquid crystal light valves arranged on the corresponding optical paths of color lights of the wavelength regions (λR, λG, λB) when the voltage applying device applies the predetermined second voltage to the liquid crystal panels of the liquid crystal light valves formed such that the wavelength region (λA) is present further on the long wavelength side than the wavelength regions (λR, λG, λB). As a result, it is possible to reduce or eliminate the difference between the light transmittance in the wavelength region (λA) of the liquid crystal light valve in the first voltage state when the first voltage is applied to the liquid crystal panel and the light transmittance in the wavelength regions (λR, λG, λB) corresponding to color lights on optical paths on which the liquid crystal light valves in the second voltage state when the second voltage is applied to the liquid crystal panel. Therefore, it is possible to control the occurrence of loss of light in the liquid crystal light valve and control the fall in light utilization efficiency.

Therefore, the projector according to certain embodiments is a projector including plural liquid crystal panels of the VA type and the normally black system, wherein the projector can further improve light utilization efficiency.

In recent years, there are rapidly increasing demands for home projectors for enjoying movies and the like in homes. In such home projectors, since it is important to improve reproducibility of dark scenes and smoothly reproduce human skin colors, it is preferable that color temperature is low and a chromaticity coordinates of a projected white image is close to a black body locus. However, in the projector in the past including plural liquid crystal panels of the VA type and the normally black system, since light utilization efficiency of the red light is low as described above, it is difficult to reduce the color temperature while maintaining brightness and bring the chromaticity coordinates of the projected white image closer to the black body locus.

On the other hand, with the projector according to certain embodiments, it is possible to improve light utilization efficiency of the red light as described above. Therefore, it is possible to reduce the color temperature while maintaining brightness and bring the chromaticity coordinates of the projected white image closer to the black body locus. As a result, the projector according to various embodiments can be effective for the home projectors for enjoying movies and the like in homes.

In certain embodiments of the projector the plural liquid crystal light valves are formed such that a wavelength region of light where light transmittance of the liquid crystal light valves is maximized in a voltage ON state, in which the first voltage is applied to the liquid crystal panels, is present in a wavelength region same as a wavelength region of color light having a largest wavelength among the plural color lights separated by the color-separating optical system. As such, in various embodiments, it is possible to form all the liquid crystal light valves in the same structure. Therefore, it is possible to reduce cost in manufacturing the projector.

In certain embodiments of the projector at least two of the plural liquid crystal light valves have the same structure. As such, in various embodiments, it is also possible to reduce cost in manufacturing the projector.

In certain embodiments of the projector the predetermined bias voltage or the predetermined second voltage is a voltage that maximizes light transmittance of the liquid crystal light valve in a wavelength region where luminosity factor is maximized. As such, in various embodiments, it is possible to obtain a brighter projected image.

In certain embodiments of the projector the predetermined bias voltage or the predetermined second voltage is a voltage that maximizes light transmittance of the liquid crystal light value in a wavelength region where a tristimulus value is maximized. As such, in various embodiments, it is possible to obtain a clearer image.

BRIEF DESCRIPTION OF THE DRAWINGS

Non-limiting and non-exhaustive embodiments of the present disclosure are described with reference to the accompanying drawings, wherein like reference numbers designate like elements.

DETAILED DESCRIPTION

In the following detailed description, reference is made to the accompanying drawings which form a part hereof wherein like numerals designate like parts throughout, and in which are shown, by way of illustration, specific embodiments in which the invention may be practiced. It is to be understood that other embodiments may be utilized and structural or logical changes may be made without departing from the scope of the present invention. Therefore, the following detailed description is not to be taken in a limiting sense, and the scope of the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

Throughout the specification and claims, the following terms take at least the meanings explicitly associated herein, unless the context clearly dictates otherwise. The meanings identified below are not intended to limit the terms, but merely provide illustrative examples for use of the terms.

Reference to "one embodiment" or "an embodiment" or "the embodiment" means that a particular feature, structure, or characteristic described in connection with the embodiment is included in at least one embodiment of the disclosure. The appearances of the phrase "one embodiment" or "an embodiment" or "the embodiment" in various places in the specification do not necessarily all refer to the same embodiment; however, they may. The terms "comprising", "having", and "including" should be considered synonymous, unless context dictates otherwise. The phrase "A/B" means "A or B". The phrase "A and/or B" means "(A), (B), or (A and B)". The phrase "at least one of A, B, and C" means "(A), (B), (C), (A and B), (A and C), (B and C) or (A, B and C)". The phrase "(A) B" means "(A B) or (B)", that is "A" is optional. The use of any of these phrases does not imply or indicate that the particular feature, structure, or characteristic being described is a necessary component for every embodiment for which such a description is included.

In certain embodiments, a projector including plural liquid crystal panels of a TN type and a normally white system is described.

Figure 1:
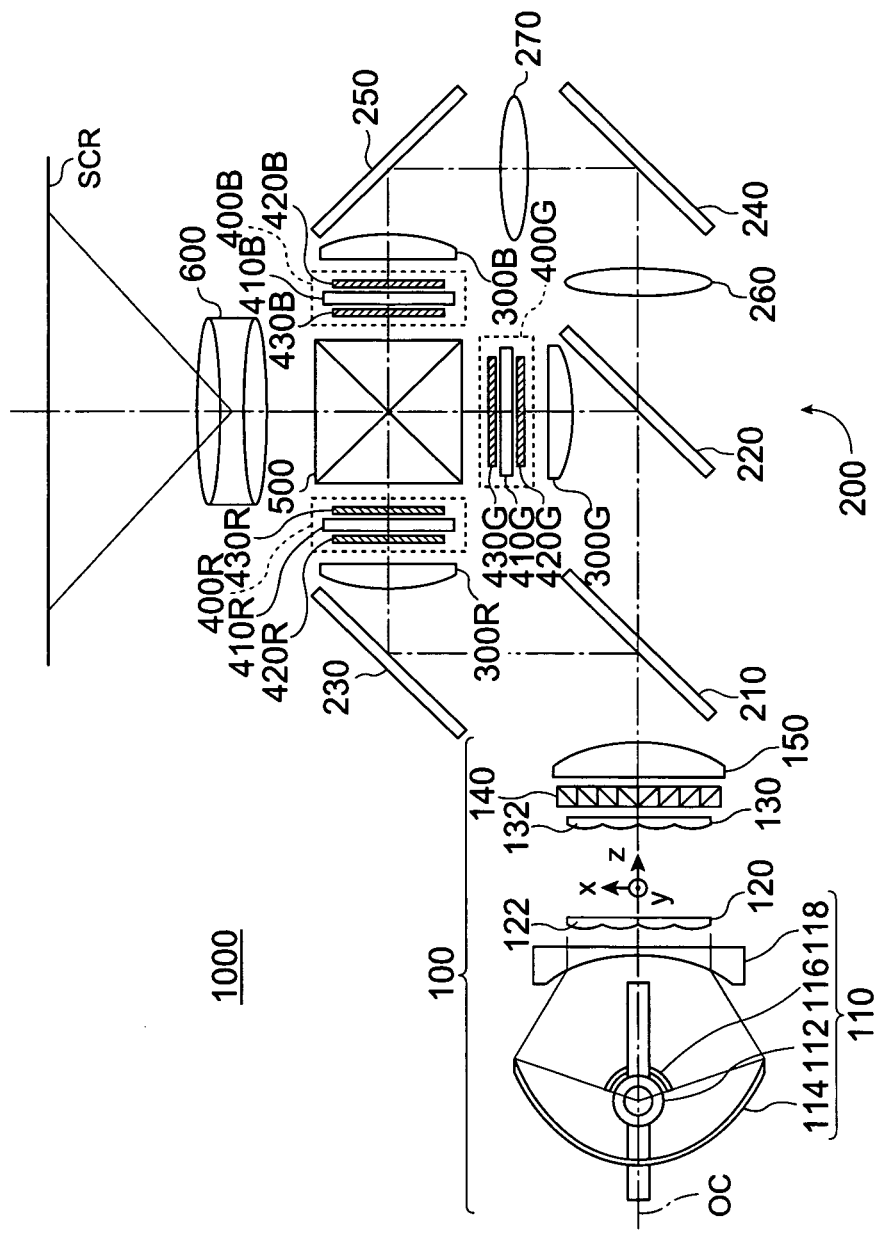
FIG. 1 is a block diagram showing an optical system of a projector 1000 in accordance with at least one embodiment.
Figure 2A:
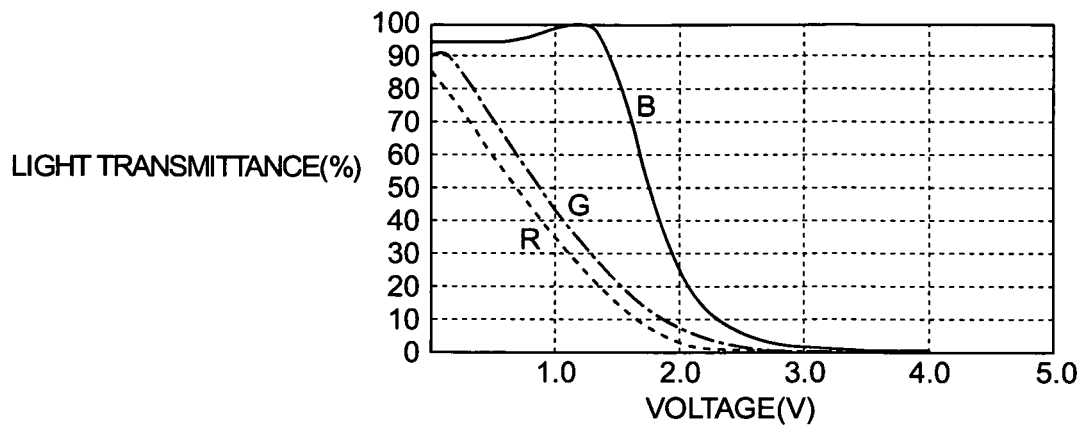
FIGS. 2A and 2B are graph diagrams illustrating the projector 1000 in accordance with at least one embodiment.
Figure 2B:
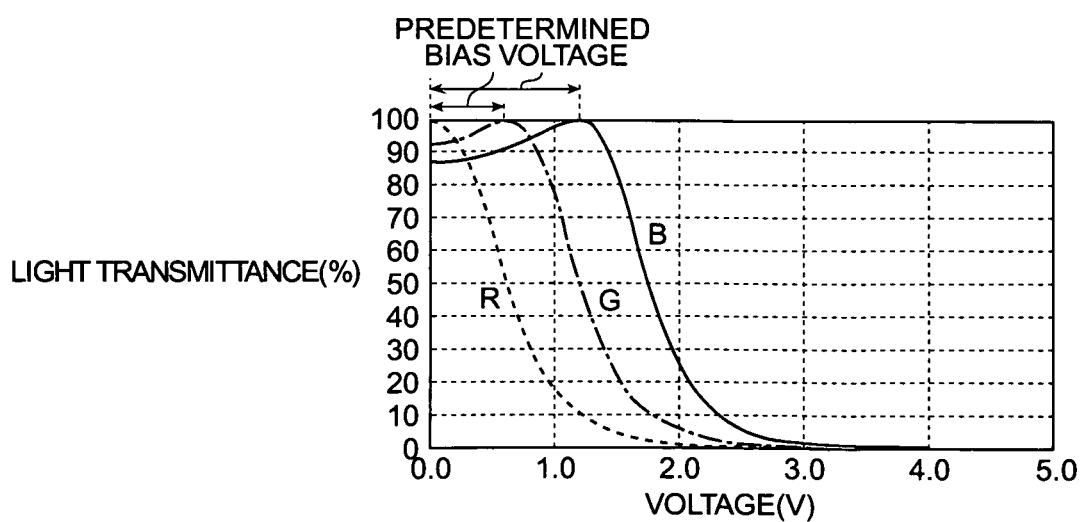
Figure 3A:
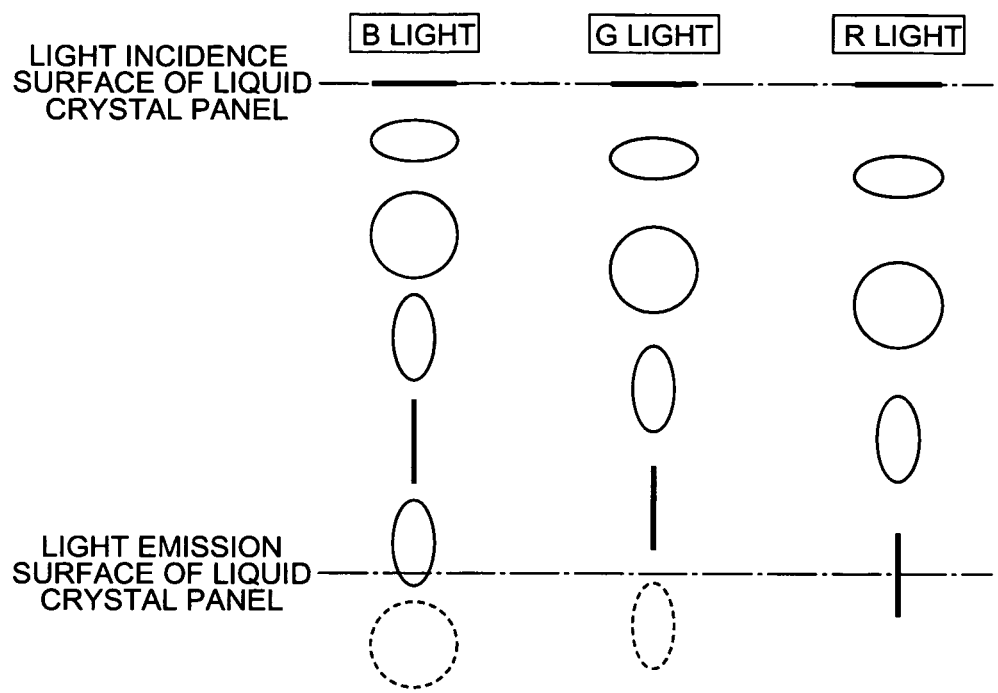
FIGS. 3A and 3B are block diagrams illustrating the projector 1000 in accordance with at least one embodiment.
Figure 3B:
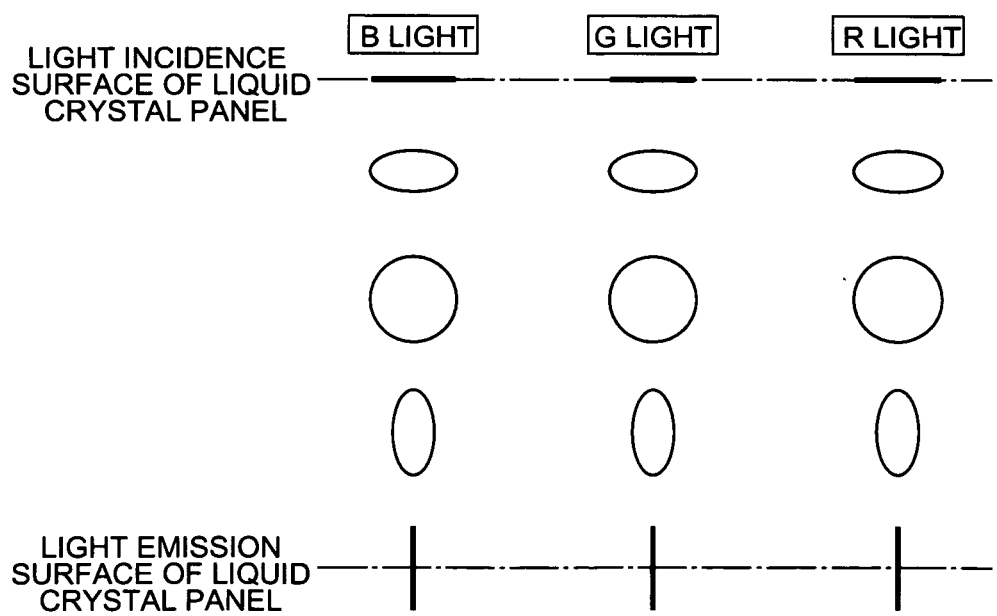

Referring now to FIG. 1, a block diagram of a portion of an optical system of a projector 1000 is shown in accordance with various embodiments of the present disclosure. In a first embodiment, a projector including plural liquid crystal panels of a TN type and a normally white system is described. FIG. 1 is a diagram showing an optical system of a projector 1000 according to an embodiment. FIGS. 2A and 2B are graphs for illustrating the projector 1000 according to at least one embodiment. FIG. 2A is a graph showing a relation between a predetermined bias voltage applied to liquid crystal panels and light transmittance of liquid crystal light valves in a projector 1000a according to a comparative example described later. FIG. 2B is a diagram showing a relation between a predetermined bias voltage applied to liquid crystal panels and light transmittance of liquid crystal light valves in the projector 1000 according to at least one embodiment. FIGS. 3A and 3B are diagrams for illustrating the projector 1000 according to at least one embodiment. FIG. 3A is a diagram schematically showing polarization states of light (linear polarized light, elliptical polarized light, and circular polarized light) made incident on liquid crystal panels 410R, 410G and 410B in a voltage OFF state in which no voltage is applied to the liquid crystal panels 410R, 410G, and 410B. FIG. 3B is a diagram schematically showing polarization states of light made incident on the liquid crystal panels 41 OR, 410, and 410B when a predetermined bias voltage is applied to the liquid crystal panels 410G and 410B.

The projector 1000 according to at least one embodiment is a projector including, as shown in FIG. 1, an illumination device 100, a color-separating optical system 200 that separates an illumination light flux from the illumination device 100 into three color lights of red light, green light, and blue light and leads the color lights to an illuminated area, three liquid crystal light valves 400R, 400G, and 400B that modulate the three color lights separated by the color-separating optical system 200 according to image information, respectively, a cross dichroic prism 500 serving as a color-combining optical system that combines the color lights modulated by the three liquid crystal light valves 400R, 400G, and 400B, a projection optical system 600 that projects light combined by the cross dichroic prism 500 on a projection plane such as a screen SCR, a liquid-crystal driving device 700 (not shown) that drives liquid crystal panels 410R, 410G, and 410B in the liquid crystal light valves 400R, 400G, and 400B on the basis of image information, and a voltage applying device 710 (not shown).

The illumination device 100 includes a light source device 110 that emits an illumination light flux to the illuminated area side, a first lens array 120 including plural first small lenses 122 for dividing the illumination light flux emitted from the light source deice 110 into plural partial light fluxes, a second lens array 130 including plural second small lenses 132 corresponding to the plural first small lenses 122 of the first lens array 120, a polarized-light conversion element 140 that converts the respective partial light fluxes from the second lens array 130 into a substantially one kind of linear polarized light with an aligned polarization direction and emits the linear polarized light, and a superimposing lens 150 for superimposing the respective partial light fluxes emitted from the polarized-light conversion element 140 in the illuminated area.

The light source device 110 includes an elliptical surface reflector 114, an arc tube 112 that has a light emission center near a first focus of the elliptical surface reflector 114, a secondary mirror 116 that reflects light, which is emitted from the arc tube 112 to the illuminated area side, to the arc tube 112, and a concave lens 118 that emits converging light from the elliptical surface reflector 114 as substantially parallel-light. The light source device 110 emits a light flux having an illumination optical axis OC as a center axis.

The arc tube 112 includes a bulb section and a pair of sealing sections extending to both sides of the bulb section. The bulb section is made of quartz glass formed in a spherical shape and has a pair of electrodes arranged in the bulb section and mercury, rare gas, and a small amount of halogen filled in the bulb section. Various arc tubes can be adopted as the arc tube 112. For example, a metal halide lamp, a high pressure mercury lamp, and a super-high pressure mercury lamp can be adopted.

The elliptical surface reflector 114 includes a neck-like section of a cylindrical shape inserted through and fastened to one sealing section of the arc tube 112 and a reflection concave surface that reflects light radiated from the arc tube 112 to a second focus position.

The secondary mirror 116 is reflecting means that covers a substantially half of the bulb section of the arc tube 112 and is arranged to be opposed to the reflection concave surface of the elliptical surface reflector 114. The secondary mirror 116 is inserted through and fastened to the other sealing section of the arc tube 112. The secondary mirror 116 returns light not traveling to the elliptical surface reflection 114 in the light radiated from the arc section 112 to the arc tube 112 and makes the light incident on the elliptical reflector 114.

The concave lens 118 is arranged on the illuminated area side of the elliptical surface reflector 114. The concave lens 118 is formed to emit light from the elliptical surface reflector 114 to the first lens array 120.

The first lens array 120 has a function of a light-flux dividing optical element that divides the light from the concave lens 118 into plural partial light fluxes. In the first lens array 120, plural first small lenses 122 are arrayed in a matrix shape of plural rows and plural columns in a surface orthogonal to the illumination optical axis OC. Although not described with reference to the drawings, an external shape of the first small lenses 122 is similar to an external shape of image forming areas of liquid crystal panels 410R, 410G, and 410B described later.

The second lens array 130 has a function of focusing images of the respective first small lenses 122 of the first lens array 120 near the image forming areas of the liquid crystal panels 410R, 410G, and 410B in cooperation with the superimposing lens 150. The second lens array 130 has the structure substantially the same as that of the first lens array 120. In the second lens array 130, plural second small lenses 132 are arrayed in a matrix shape of plural rows and plural columns in a surface orthogonal to the illumination optical axis OC.

The polarized-light conversion element 140 is a polarized-light conversion element that emits the respective partial light fluxes divided by the first lens array 120 as substantially one kind of linear polarized light with aligned polarization direction.

The polarized-light conversion element 140 includes a polarized-light separating layer that transmits light having one polarized light component (e.g., P polarized light component) of the illumination light flux from the light source device 110 and reflects the other polarized light component (e.g., S polarized light component) in a direction perpendicular to the illumination optical axis OC, a reflection layer that reflects the light having the other polarized light component reflected by the polarized-light separating layer to a direction parallel to the illumination optical axis OC, and a phase plate that converts the light having one polarized light component transmitted through the polarized-light separating layer into the light having the other polarized light component.

The superimposing lens 150 is an optical element for condensing the plural partial light fluxes, which have passed through the first lens array 120, the second lens array 130, and the polarized-light conversion element 140, and superimposing the partial light fluxes near the image forming areas of the liquid crystal panels 410R, 410G, and 410B. The superimposing lens 150 is arranged such that an optical axis of the superimposing lens 150 and the illumination optical axis OC of the illumination device 100 substantially coincide with each other. The superimposing lens 150 may be a composite lens formed by combining plural lenses.

The color-separating optical system 200 includes dichroic mirrors 210 and 220, reflection mirrors 230, 240, and 250, an incidence side lens 260, and a relay lens 270. The color-separating optical system 200 has a function of separating an illumination light flux emitted from the superimposing lens 150 into three color lights of red light, green light, and blue light and leading the respective color lights to the three liquid crystal light valves 400R, 400G, and 400B, which are illumination objects.

The dichroic mirrors 210 and 220 are optical elements in which wavelength selecting films that reflect light fluxes in a predetermined wavelength region and transmit light fluxes in other wavelength regions are formed on a substrate. The dichroic mirror 210 is a mirror that reflects a red light component and transmits other color light components. The dichroic mirror 220 arranged at a post stage of an optical path is a mirror that reflects a green light component and transmits a blue light component.

The red light component reflected by the dichroic mirror 210 is bent by the reflection mirror 230 and made incident on the liquid crystal light valve 400R for red light through a condensing lens 300R. The condensing lens 300R is provided in order to convert the respective partial light fluxes from the superimposing lens 150 into light fluxes substantially parallel to respective principal rays. Other condensing lenses 300G and 300B have the same structure as the condensing lens 300R.

The green light component of the green light component and the blue light component transmitted through the dichroic mirror 210 is reflected by the dichroic mirror 220, transmitted through the condensing lens 300G, and made incident on the liquid crystal light valve 400G for green light. On the other hand, the blue light component is transmitted through the dichroic mirror 220, transmitted through the incidence side lens 260, the reflection mirror 240 on the incidence side, the relay lens 270, the reflection mirror 250 on the emission side, and the condensing lens 300B, and made incident on the liquid crystal light valve 400B for blue light. The incidence side lens 260, the relay lens 270, and the reflection mirror 240 and 250 have a function of leading the blue light component transmitted through the dichroic mirror 220 to the liquid crystal light valve 400B.

The liquid crystal light valves 400R, 400G, and 400B modulate an illumination light flux according to image information. The liquid crystal light vales 400R, 400G, and 400B are illuminated by light from the illumination device 100.

The liquid crystal light valves 400R, 400G, and 400B respectively include liquid crystal panels 410R, 410G, and 410B, incidence side polarizers 420R, 420, and 420B arranged on light incidence sides of the liquid crystal panels 410R, 410, and 410B, and emission-side polarizers 430R, 430G, and 430B that are arranged on light emission sides of the liquid crystal panels 410R, 410G, and 410B and transmit light on polarization axes orthogonal to polarization axes of light transmitted through the incidence side polarizers 420R, 420G, and 420B.

The liquid crystal panels 410R, 410G, and 410B are formed by filling liquid crystal as an electro-optic substance between a pair of light-transmissive glass substrates and sealing the glass substrates. The liquid crystal panels 410R, 410G, and 410B are liquid crystal panels of the TN type and the normally white system. For example, the liquid crystal panels 410R, 410G, and 410B modulate a polarization direction of one kind of linear polarized light emitted from the incidence side polarizers 420R, 420G, and 420B according to given image information using a polysilicon TFT as a switching element.

Optical modulation for respective incident color lights is performed by the incidence side polarizers 420R, 420G, and 420B, the liquid crystal panels 410R, 410G, and 410B, and the emission-side polarizers 430R, 430G, and 430B.

Each of the liquid crystal light valves 400R, 400G, and 400B is formed such that a wavelength region of light where light transmittance of the liquid crystal light valves 400R, 400G, and 400B is maximized in a voltage OFF state, in which no voltage is applied to the liquid crystal panels 410R, 410G, and 410B, is present in a wavelength region same as a wavelength region of the red light that has a longest wavelength among the three color lights (the red light, the green light, and the blue light) separated by the color-separating optical system 200.

Therefore, in the liquid crystal light valves 400G and 400B, a wavelength region of light where light transmittance of the liquid crystal light valves 400G and 400B is maximized in the voltage OFF state is present further on a long wavelength side than wavelength regions of the color lights (the green light and the blue light) on optical paths on which the liquid crystal light valves 400G and 400B are arranged. These are due to the differences in index of refraction among the blue light, green light and red light.

The liquid-crystal driving device 700 supplies a driving voltage based on image information to the liquid crystal panels 410R, 410G, and 410B and drives the liquid crystal panels 410R, 410G and 410B.

The voltage applying device 710 has a function of applying a predetermined bias voltage to the liquid crystal panels 410G and 410B of the liquid crystal light valves 400G and 400B. The predetermined bias voltage is a voltage adjusted to reduce or eliminate a difference in light transmittance such that light transmittance of the liquid crystal light valves is not different for each of the color lights in a wavelength with which luminosity factor is maximized within wavelength region ranges of the respective color lights. The predetermined bias voltage is described in detail later.

The cross dichroic prism 500 is an optical element that combines optical images modulated for the respective color lights emitted from the emission-side polarizers and forms a color image. The cross dichroic prism 500 assumes a regular square shape in a plan view formed by bonding four rectangular prisms. Dielectric multi-layer films are formed on interfaces of a substantially X shape where the rectangular prisms are bonded. The dielectric multilayer film formed on one interface of the substantially X shape reflects the blue light. The dielectric multilayer film formed on the other interface reflects the red light. The blue light and the red light are bent by these dielectric multilayer films and traveling directions of the blue light and the red light are aligned with a traveling direction of the green light, whereby the three color lights are combined.

The color image emitted from the cross dichroic prism 500 is enlarged and projected by the projection optical system 600 and forms a large screen image on the screen SCR.

In describing the projector 1000 in greater detail, the projector 1000a according to the comparative example of the first embodiment is described.

The projector 1000a (not shown) according to the comparative example basically has the structure very similar to the projector 1000 according to the first embodiment. However, the structure of liquid crystal light valves is different from that of the projector 1000 according to the first embodiment.

In the projector 1000a according to the comparative example, a liquid crystal light valve for red light, a liquid crystal light valve for green light, and a liquid crystal light valve for blue light are formed such that a wavelength region of light ($\lambda AO$) where light transmittance of the liquid crystal light valves is maximized in a voltage OFF state, in which no voltage is applied to liquid crystal panels, is present between blue light and green light.

Figure 7:
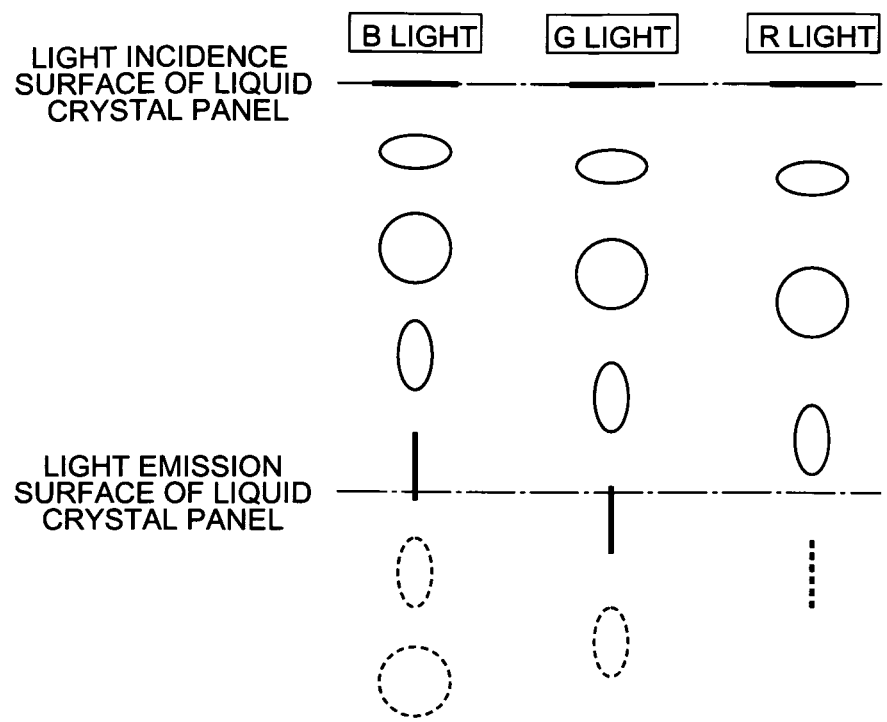
FIG. 7 is a block diagram illustrating a problem in a projector.

Therefore, concerning the liquid crystal light valve for blue light, while a voltage is OFF, polarized light in a wavelength region of the blue light ($\lambda B$) made incident on the liquid crystal panel is linear polarized light but polarized light in a wavelength region of the blue light ($\lambda B$) emitted from the liquid crystal panel is elliptical polarized light further modulated than linear polarized light that crosses the incident linear polarized light (about a polarization state, see FIG. 7). Since a part of light in a wavelength region of the blue light ($\lambda B$) after being modulated by the liquid crystal panel is blocked by an emission side polarizer, light transmittance in a wavelength region of the blue light ($\lambda B$) falls (see FIG. 2A). In this case, the elliptical polarized light in a wavelength region of the blue light ($\lambda B$) to be emitted from the liquid crystal panel for blue light can be modified to linear polarized light, which is transmitted through the emission-side polarizer, by applying a predetermined bias voltage to the liquid crystal panel of the liquid crystal light valve for blue light. Therefore, it is possible to bring light transmittance in the wavelength region ($\lambda B$) of the liquid crystal light valve for blue light when the predetermined bias voltage is applied to the liquid crystal panel closer to light transmittance in the wavelength region ($\lambda AO$) of the liquid crystal light valve for blue light when no voltage is applied to the liquid crystal panel or adjust light transmittance in the wavelength region ($\lambda B$) of the liquid crystal light valve for blue light when the predetermined bias voltage is applied to the liquid crystal panel to light transmittance in the wavelength region ($\lambda AO$) of the liquid crystal light valve for blue light when no voltage is applied to the liquid crystal panel. As such, in various embodiments, for example, when an image with highest luminance is displayed by the projector 1000a, the predetermined bias voltage is applied to the liquid crystal panel of the liquid crystal light valve for blue light so that it is possible to reduce or eliminate a difference between light transmittance in the wavelength region ($\lambda B$) of the liquid crystal light valve for blue light when the predetermined bias voltage is applied to the liquid crystal panel and light transmittance in the wavelength region ($\lambda AO$) of the liquid crystal light valve for blue light when no voltage is applied to the liquid crystal panel. Therefore, it is possible to control the occurrence of loss of light and control the fall in light utilization efficiency of the blue light.

However, concerning the liquid crystal light valve for green light and the liquid crystal light valve for red light, it is difficult to control the fall in light utilization efficiency of the green light and the red light because of reasons described below. Concerning the liquid crystal light valve for green light and the liquid crystal light valve for red light, while a voltage is OFF, polarized lights in a wavelength region of the green light ($\lambda G$) and a wavelength region of red light ($\lambda R$)

made incident on the respective liquid crystal panels are linear polarized lights but polarized lights in a wavelength region of the green light (λG) and a wavelength region of red light (λR) emitted from the respective liquid crystal panels are not modulated to be linear polarized lights that cross the incident linear polarized lights are emitted in a state of elliptical polarized lights (about a polarization state, see FIG. 7). Since a part of lights in a wavelength region of the green light (λG) and a wavelength region of red light (λR) after being modulated by the liquid crystal panels are blocked by emission side polarizers, light transmittance in a wavelength region of the green light (λG) and a wavelength region of red light (λR) falls (see FIG. 2A). In this case, even if a predetermined bias voltage is applied to the liquid crystal panels of the liquid crystal light valve for green light and the liquid crystal light valve for red light, it is difficult to compensate for insufficiency of modulation for the lights in a wavelength region of the green light (λG) and a wavelength region of red light (λR). Therefore, it is difficult to bring light transmittance of the liquid crystal light valve in the wavelength region of green light (λG) and light transmittance of the liquid crystal light valve in the wavelength region of red light (λR) closer to light transmittance in the wavelength region (λAO) of the liquid crystal light valve when no voltage is applied to the liquid crystal panel or uniform light transmittance of the liquid crystal light valve in the wavelength region of green light (λG) and light transmittance of the liquid crystal light valve in the wavelength region of red light (λR) to light transmittance in the wavelength region (λAO) of the liquid crystal light valve when no voltage is applied to the liquid crystal panel. In other words, even if the predetermined bias voltage is applied to the respective liquid crystal panels of the liquid crystal light valve for green light and the liquid crystal light valve for red light, it is difficult to increase light transmittance of the liquid crystal light valves in the wavelength regions of the respective color lights. As a result, for example, when an image with highest luminance is displayed by the projector 1000a, concerning the green light and the red light, it is difficult to control the occurrence of loss of light and control the fall in light utilization efficiency of green light and the red light.

On the other hand, in the projector 1000 according to the first embodiment described above, the liquid crystal light valve 400R is formed such that the wavelength region of light (λA) where light transmittance of the liquid crystal light valve 400R is maximized in a voltage OFF state, in which no voltage is applied to the liquid crystal panel 410R, is present in a wavelength region same as the wavelength region of the red light (λR). Therefore, it is possible to improve light utilization efficiency of the red light.

In the projector 1000 according to the first embodiment, the liquid crystal light valves 400G and 400B are formed such that the wavelength region of light (λA) where light transmittance of the liquid crystal light valves 400G and 400B is maximized in the voltage OFF state is present further on a long wavelength side than wavelength regions of the color lights (the wavelength region of the green light (λG) and the wavelength region of the blue light (λB)) on the optical paths on which the liquid crystal light valves 400G and 400B are arranged.

In this case, while a voltage is OFF, as in the case of the projector 1000a according to the comparative example, as shown in FIG. 3A, polarized lights in the wavelength region (λG) and the wavelength region (λB) emitted from the respective liquid crystal panels 410G and 410B are elliptical polarized lights further modulated than linear polarized lights that cross incident linear polarized lights and a part of lights in the wavelength region (λG) and the wavelength region (λB) after being modulated by the respective liquid crystal panels 410G and 410B are blocked by the emission-side polarizers 430G and 430B. Therefore, light transmittance in the wavelength region (λG) and the wavelength region (λB) falls. However, the elliptical polarized lights emitted from the liquid crystal panel 410G for green light and the liquid crystal panel 410B for blue light can be modulated to linear polarized light, which is transmitted through the emission-side polarizers 430G and 430B as shown in FIG. 3B, by applying a predetermined bias voltage to the liquid crystal panels 410G and 410B using the voltage applying device 710 (see FIG. 2B). Therefore, it is possible to bring light transmittance in the wavelength region (λG) and the wavelength region (λB) of the liquid crystal light valves 400G and 400B when the predetermined bias voltage is applied to the liquid crystal panels 410G and 410B, respectively closer to light transmittance of in the wavelength region (λA) of the liquid crystal light valves 400G and 400B when no voltage is applied to the liquid crystal panels 410G and 410B, respectively or uniform light transmittance in the wavelength region (λG) and the wavelength region (λB) of the liquid crystal light valves 400G and 400B when the predetermined bias voltage is applied to the liquid crystal panels 410G and 410B, respectively and light transmittance in the wavelength region (λA) of the liquid crystal light valves 400G and 400B when no voltage is applied to the liquid crystal panels 410G and 410B. As such, in various embodiments, in particular, when an image with highest luminance is displayed by the projector 1000, the predetermined bias voltage is applied to the liquid crystal panels 410G and 410B of the liquid crystal light valves 400G and 400B so that it is possible to reduce or eliminate a difference between light transmittance in the wavelength region (λG) and the wavelength region (λB) of the liquid crystal light valves 400G and 400B and light transmittance in the wavelength region (λA) of the liquid crystal light valves when no voltage is applied to the liquid crystal panels 410G and 410B, respectively. Therefore, it is possible to control the occurrence of loss of light and control the fall in light utilization efficiency of the green light and the blue light.

Therefore, the projector 1000 according to at least one embodiment is a projector including plural liquid crystal panels of the TN type and the normally white system, wherein the projector can further improve light utilization efficiency.

With the projector 1000 according to the first embodiment, it is possible to improve light utilization efficiency of the red light. Therefore, it is possible to reduce color temperature while maintaining brightness and bring a chromaticity coordinates of a projected white image closer to a black body locus. As a result, the projector 1000 according to the first embodiment is particularly effective for the home projectors for enjoying movies and the like in homes.

In the projector 1000 configured according to at least one embodiment, the liquid crystal light valves 400R, 400G, and 400B are formed such that a wavelength region of light where light transmittance of the liquid crystal light valves 400R, 400G, and 400B is maximized in a voltage OFF state, in which no voltage is applied to the liquid crystal panels 410R, 410G, and 410B, is present in a wavelength region same as a wavelength region of the red light. As such, in various embodiments, it is possible to form all the liquid crystal light valves in the same structure. Therefore, it is possible to reduce cost in manufacturing the projector.

In the projector 1000 configured according to at least one embodiment, a predetermined bias voltage applied by the voltage applying device 710 is a voltage that maximizes luminosity factor. Therefore, it is possible to obtain a brighter projected image.

In accordance with certain embodiments, a projector including plural liquid crystal panel of a VA type and a normally black system is described.

Figure 4:
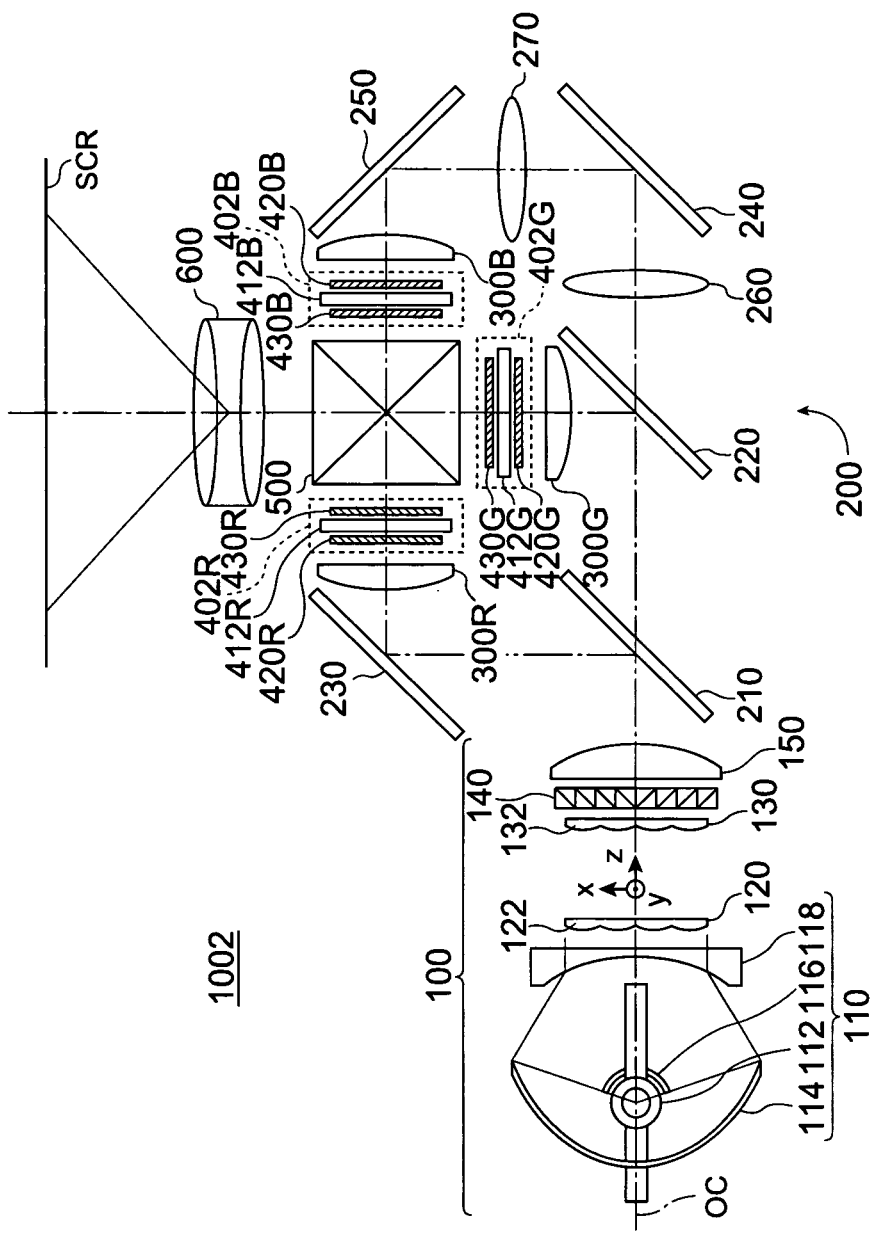
FIG. 4 is a block diagram showing an optical system of a projector 1002 in accordance with at least one embodiment of the invention.
Figure 5A:
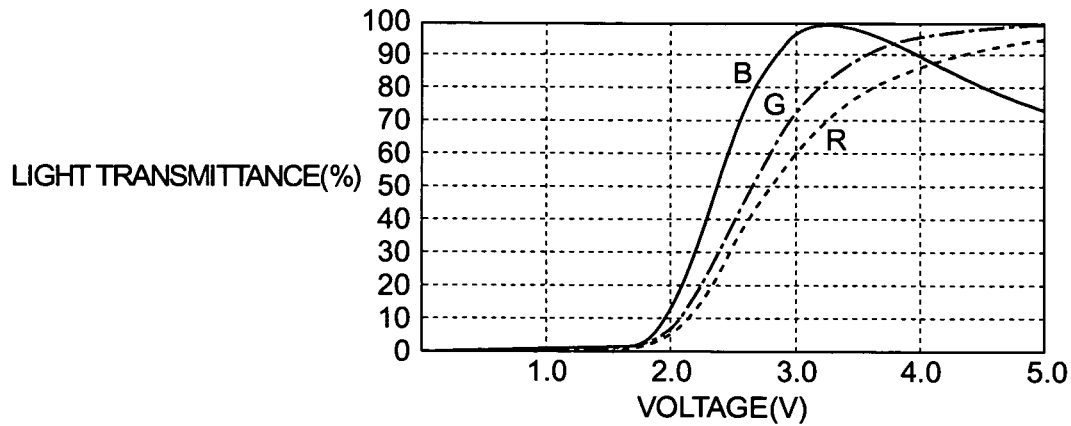
FIGS. 5A and 5B are graph diagrams for illustrating the projector 1002 in accordance with at least one embodiment.
Figure 5B:
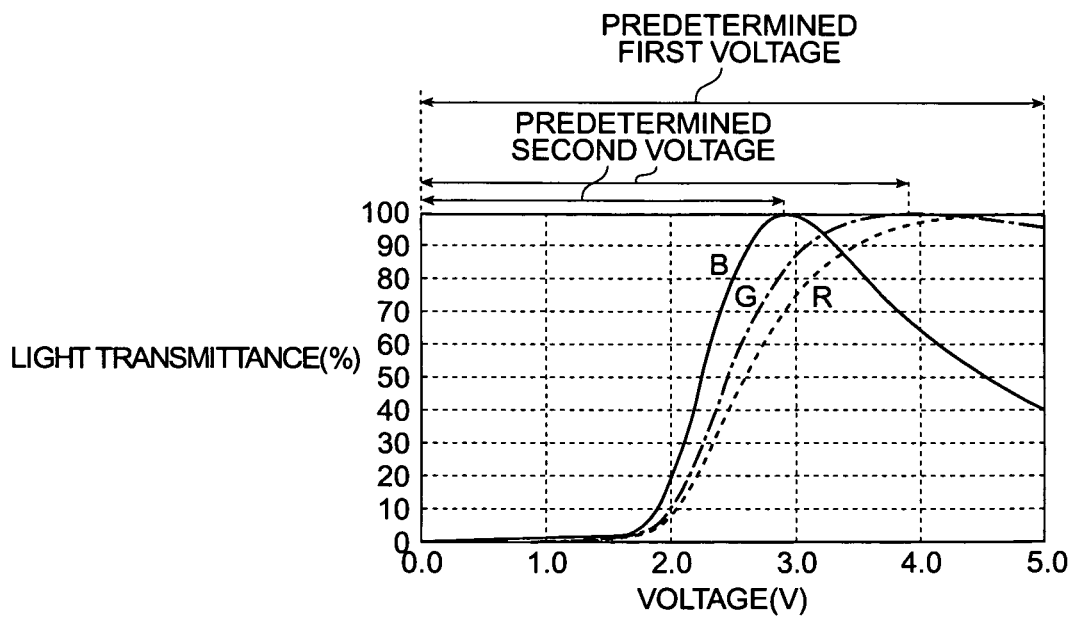
Figure 6A:
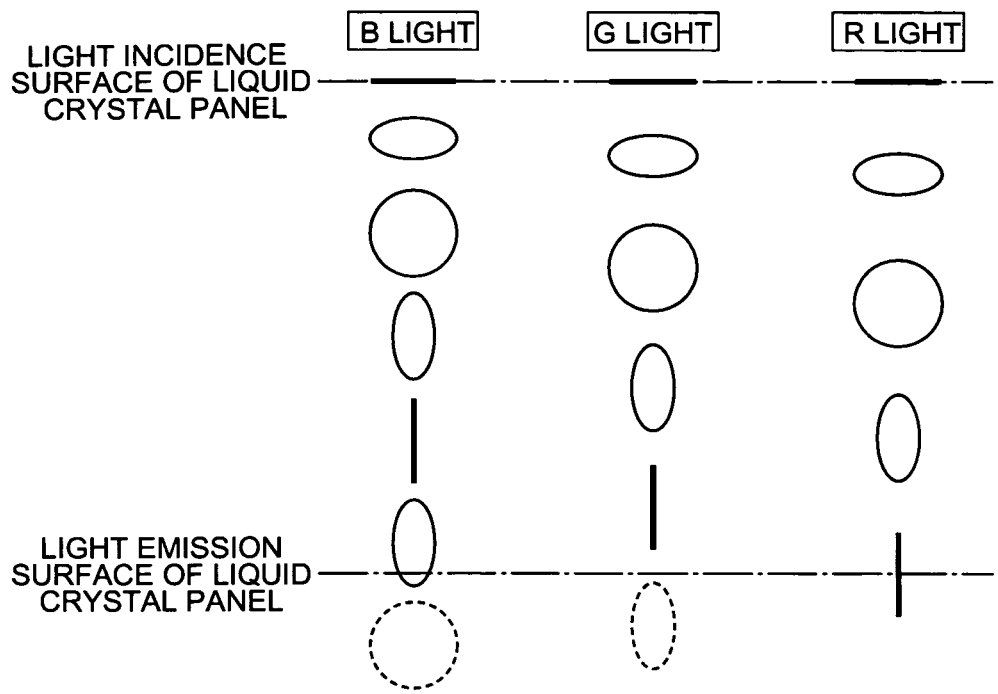
FIGS. 6A and 6B are block diagrams for illustrating the projector 1002 in accordance with at least one embodiment.
Figure 6B:
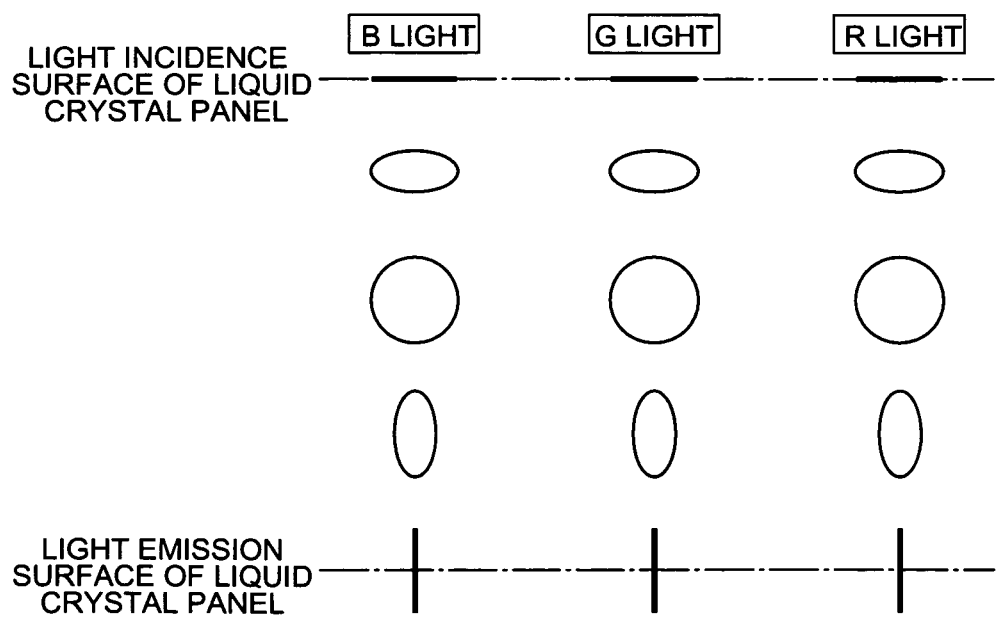

FIG. 4 is a diagram showing an optical system of a projector 1002 according to the second embodiment. FIGS. 5A and 5B are graphs for describing the projector 1002 according to the second embodiment. FIG. 5A is a graph showing a relation between a predetermined first voltage applied to liquid crystal panels and light transmittance of liquid crystal light valves in a projector 1002a according to a comparative example described later. FIG. 5B is a diagram showing a relation between a predetermined second voltage applied to the liquid crystal panels and light transmittance of the liquid crystal light valves in the projector 1002 according to the second embodiment. FIGS. 6A and 6B are diagrams for describing the projector 1002 according to the second embodiment. FIG. 6A is a diagram schematically showing polarization states of light (linear polarized light, elliptical polarized light, and circular polarized light) made incident on liquid crystal panels 412R, 412G, and 412B in a voltage ON state in which the first voltage is applied to liquid crystal panels 412R, 412G, and 412B. FIG. 6B is a diagram schematically showing polarization states of light made incident on the liquid crystal panels 412R, 412G, and 412B when the predetermined second voltage is applied to the liquid crystal panels 412G and 412B. In FIG. 4, members identical with those in FIG. 1 are denoted by the identical reference numerals and signs and detailed explanation of the members is omitted.

As it is seen from FIG. 4, the projector 1002 according to the second embodiment basically has the structure same as that of the projector 1000 configured according to at least one embodiment. However, the projector 1002 configured according to an alternative embodiment is different from the projector 1000 according to the at least one embodiment in the structure of liquid crystal light valves and in that the projector 1002 does not include a voltage applying device. Therefore, in the projector 1002 according to the second embodiment, a function of a liquid-crystal driving device is different from the projector 1000 according to at least one embodiment.

In the projector 1002 according to the second embodiment, liquid crystal light valves 402R, 402G, and 402B include liquid crystal panels 412R, 412G, and 412B of the VA type and the normally black system, incidence-side polarizers 420R, 420G, and 420B arranged on light incidence sides of the liquid crystal panels 412R, 412G, and 412B, and emission-side polarizers 430R, 430G, and 430B that are arranged on light emission sides of the liquid crystal panels 412R, 412G, and 412B and transmit polarized lights on polarization axes orthogonal to polarization axes of polarized light transmitted through the incidence-side polarizers 420R, 420G, and 420B.

Each of the liquid crystal light valves 402R, 402G, and 402B is formed such that a wavelength region of light where light transmittance of the liquid crystal light valves 402R, 402G, and 402B is maximized in a voltage ON state, in which a predetermined first voltage is applied to the liquid crystal panels 412R, 412G, and 412B, is present in a wavelength region same as a wavelength region of red light having a largest wavelength among three color lights (red light, green light, and blue light) separated by the color-separating optical system 200.

Therefore, in the liquid crystal light valves 402G and 402B, a wavelength region of light where light transmittance of the liquid crystal light valves 402G and 402B is maximized in the voltage ON state is present further on a long wavelength side than wavelength regions of the color lights (the green light and the blue light) on the optical paths on which the liquid crystal light valves 402G ad 402B are arranged.

A liquid-crystal driving device 702 (not shown) has a function of applying a predetermined second voltage to the liquid crystal panels 412G and 412B of the liquid crystal light valves 402G and 402B in addition to a function of supplying a driving voltage based on image information to the liquid crystal panels 412R, 412G, and 412B and driving the liquid crystal panels 412R, 412G, and 412B. The predetermined second voltage is a voltage adjusted to reduce or eliminate a difference in light transmittance such that light transmittance of the liquid crystal light valves is not different for each of the color lights in a wavelength with which luminosity factor is maximized within wavelength region ranges of the respective color lights.

In describing the projector 1002 according to the second embodiment more in detail, the projector 1002a according to the comparative example of the second embodiment is described.

The projector 1002a (not shown) according to the comparative example basically has the structure very similar to that of the projector 1002 according to the second embodiment. However, the projector 1002a according to the comparative example is different from the projector 1002 according to the second embodiment in the structure of liquid crystal light valves.

In the projector 1002a according to the comparative example, a liquid crystal light valve for red light, a liquid crystal light valve for green light, and a liquid crystal light valve for blue light are formed such that a wavelength region of light ($\lambda$AO) where light transmittance of the liquid crystal light valves is maximized in a voltage ON state, in which a predetermined first voltage is applied to liquid crystal panels, is present between blue light and green light.

Figure 8:
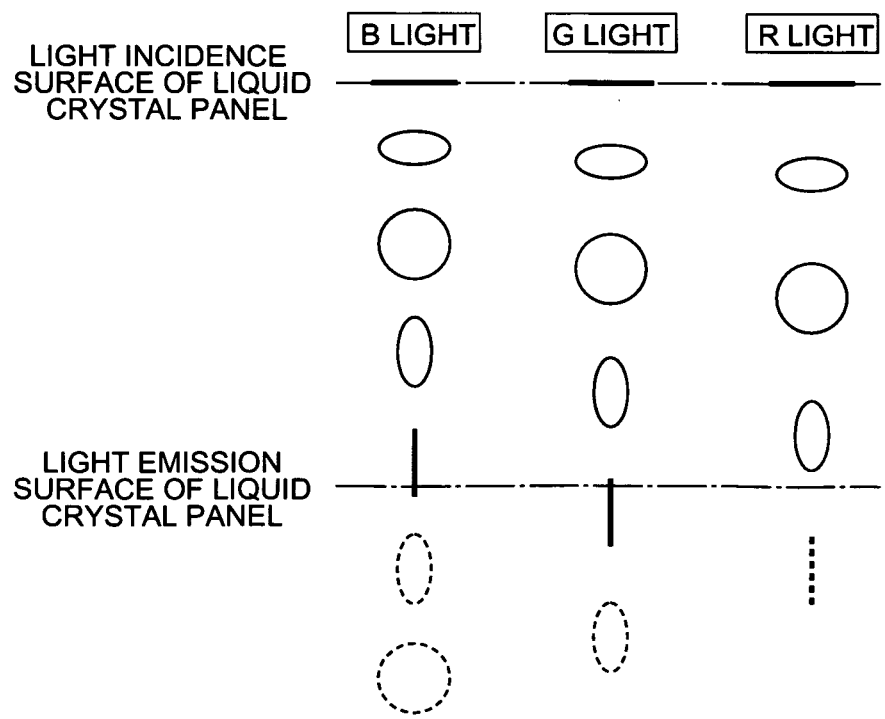
FIG. 8 is a block diagram illustrating a problem in a projector.

Therefore, concerning the liquid crystal light valve for blue light, while a voltage is ON, polarized light in a wavelength region of the blue light ($\lambda$B) made incident on the liquid crystal panel is linear polarized light but polarized light in a wavelength region of the blue light ($\lambda$B) emitted from the liquid crystal panel is elliptical polarized light further modulated than linear polarized light that crosses the incident linear polarized light (about a polarization state, see FIG. 8). Since a part of light in a wavelength region of the blue light ($\lambda$B) after being modulated by the liquid crystal panel is blocked by an emission side polarizer, light transmittance in a wavelength region of the blue light ($\lambda$B) falls (see FIG. 5A). In this case, the elliptical polarized light in a wavelength region of the blue light ($\lambda$B) to be emitted from the liquid crystal panel for blue light can be modified to linear polarized light, which is transmitted through the emission-side polarizer, by applying a predetermined second voltage to the liquid crystal panel of the liquid crystal light valve for blue light. Therefore, it is possible to bring light transmittance in a wavelength region of the blue light ($\lambda$B) of the liquid crystal light valve for blue light when the predetermined bias voltage is applied to the liquid crystal panel closer to light transmittance in the wavelength region ($\lambda$AO) of the liquid crystal light valve for blue light when no voltage is applied to the liquid crystal panel or adjust light transmittance in the wavelength region ($\lambda$B) of the liquid crystal light valve for blue light when the predetermined bias voltage is applied to the liquid crystal panel to light transmittance in the wavelength region ($\lambda$AO) of the liquid crystal light valve for blue light when no voltage is applied to the liquid crystal panel. As such, in various embodiments, for example, when an image with highest luminance is displayed by the projector 1002*a*, the predetermined bias voltage is applied to the liquid crystal panel of the liquid crystal light valve for blue light so that it is possible to reduce or eliminate a difference between light transmittance in the wavelength region (λB) of the liquid crystal light valve for blue light when the predetermined bias voltage is applied to the liquid crystal panel and light transmittance in the wavelength region (λAO) of the liquid crystal light valve for blue light when no voltage is applied to the liquid crystal panel. Therefore, it is possible to control the occurrence of loss of light and control the fall in light utilization efficiency of the blue light.

However, concerning the liquid crystal light valve for green light and the liquid crystal light valve for red light, controlling the fall in light utilization efficiency of the green light and the red light is difficult because of reasons described below. Concerning the liquid crystal light valve for green light and the liquid crystal light valve for red light, while a voltage is ON, polarized lights in a wavelength region of the green light (λG) and a wavelength region of red light (λR) made incident on the respective liquid crystal panels are linear polarized lights but polarized lights in a wavelength region of the green light (λG) and a wavelength region of red light (λR) emitted from the respective liquid crystal panels are not modulated to be linear polarized lights that cross the incident linear polarized lights and are emitted in a state of elliptical polarized lights (about a polarization state, see FIG. 8). Since a part of lights in a wavelength region of the green light (λG) and a wavelength region of red light (λR) after being modulated by the liquid crystal panels are blocked by emission side polarizers, light transmittance in a wavelength region of the green light (λG) and a wavelength region of red light (λR) falls (see FIG. 5A). In this case, even if the predetermined second voltage is applied to the liquid crystal panels of the liquid crystal light valve for green light and the liquid crystal light valve for red light, it is difficult to compensate for insufficiency of modulation for the lights in a wavelength region of the green light (λG) and a wavelength region of red light (λR). Therefore, it is difficult to bring light transmittance of the liquid crystal light valve in the wavelength region of green light (λG) and light transmittance of the liquid crystal light valve in the wavelength region of red light (λR) closer to light transmittance in the wavelength region (λOA) of the liquid crystal light valve when no voltage is applied to the liquid crystal panel or uniform light transmittance of the liquid crystal light valve in the wavelength region of green light (λG) and light transmittance of the liquid crystal light valve in the wavelength region of red light (λR) to light transmittance in the wavelength region (λAO) of the liquid crystal light valve when no voltage is applied to the liquid crystal panel. In other words, even if the predetermined second voltage is applied to the respective liquid crystal panels of the liquid crystal light valve for green light and the liquid crystal light valve for red light, it is difficult to increase light transmittance of the liquid crystal light valves in the wavelength regions of the respective color lights. As a result, for example, when an image with highest luminance is displayed by the projector 1002*a*, concerning the green light and the red light, it is difficult to control the occurrence of loss of light and control the fall in light utilization efficiency of green light and the red light.

On the other hand, in the projector 1002 according to the second embodiment described above, the liquid crystal light valve 402R is formed such that the wavelength region of light (λA) where light transmittance of the liquid crystal light valve 402R is maximized in a voltage ON state, in which a first voltage is applied to the liquid crystal panel 412R, is present in a wavelength region same as the wavelength region of the red light (λR). Therefore, it is possible to improve light utilization efficiency of the red light.

In the projector 1002 according to the second embodiment, the liquid crystal light valves 402G and 402B are formed such that the wavelength region of light (λA) where light transmittance of the liquid crystal light valves 402G and 402B is maximized in the voltage ON state is present further on a long wavelength side than wavelength regions of the color lights (the wavelength region of the green light (λG)) and the wavelength region of the blue light (λB)) on the optical paths on which the liquid crystal light valves 402G and 402B are arranged.

In this case, while a voltage is ON, as in the case of the projector 1002*a* according to the comparative example, as shown in FIG. 6A, polarized lights in the wavelength region (λG) and the wavelength region (λB) emitted from the respective liquid crystal panels 412G and 412B are elliptical polarized lights further modulated than linear polarized lights that cross incident linear polarized lights and a part of lights in the wavelength region (λG) and the wavelength region (λB) after being modulated by the respective liquid crystal panels 412G and 412B are blocked by the emission-side polarizers 430G and 430B. Therefore, light transmittance in the wavelength region (λG) and the wavelength region (λB) falls. However, the elliptical polarized lights emitted from the liquid crystal panel 410G for green light and the liquid crystal panel 410B for blue light can be modulated to linear polarized light, which is transmitted through the emission-side polarizers 430G and 430B as shown in FIG. 6B, by applying a predetermined second voltage lower than the first voltage to the liquid crystal light valves 402G and 402B using the liquid-crystal driving device 702 (see FIG. 5B). Therefore, it is possible to bring light transmittance in the wavelength region (λG) and the wavelength region (λB) of the liquid crystal light valves 400G and 400B when the second voltage is applied to the liquid crystal panels 410G and 410B, respectively closer to light transmittance of in the wavelength region (λA) of the liquid crystal light valves 400G and 400B when the first voltage is applied to the liquid crystal panels 410G and 410B, respectively or uniform light transmittance in the wavelength region (λG) and the wavelength region (λB) of the liquid crystal light valves 402G and 402B when the second voltage is applied to the liquid crystal panels 410G and 410B, respectively and light transmittance in the wavelength region (λA) of the liquid crystal light valves 400G and 400B when the first voltage is applied to the liquid crystal panels 410G and 410B. As such, in various embodiments, in particular, when an image with highest luminance is displayed by the projector 1002, the second voltage is applied to the liquid crystal panels 410G and 410B of the liquid crystal light valves 400G and 400B so that it is possible to reduce or eliminate a difference between light transmittance in the wavelength region (λG) and the wavelength region (λB) of the liquid crystal light valves 402G and 402B and light transmittance in the wavelength region (λA) of the liquid crystal light valves when the first voltage is applied to the liquid crystal panels 410G and 410B, respectively. Therefore, it is possible to control the occurrence of loss of light and control the fall in light utilization efficiency of the green light and the blue light.

Therefore, the projector 1002 according to the second embodiment is a projector including plural liquid crystal panels of the VA type and the normally black system, wherein the projector can further improve light utilization efficiency.

With the projector 1002 according to the second embodiment, it is possible to improve light utilization efficiency of the red light. Therefore, it is possible to reduce color temperature while maintaining brightness and bring a chromaticity coordinates of a projected white image closer to a black body locus. As a result, the projector 1002 according to the second embodiment is particularly effective for the home projectors for enjoying movies and the like in homes.

In the projector 1002 according to the second embodiment, the liquid crystal light valves 402R, 402G, and 402B are formed such that a wavelength region of light where light transmittance of the liquid crystal light valves 402R, 402G, and 402B is maximized in a voltage ON state, in which the first voltage is applied to the liquid crystal panels 412R, 412G, and 412B, is present in a wavelength region same as a wavelength region of the red light. As such, in various embodiments, it is possible to form all the liquid crystal light valves in the same structure. Therefore, it is possible to reduce cost in manufacturing the projector.

In the projector 1002 according to the second embodiment, a predetermined second voltage applied by the liquid-crystal driving device 702 is a voltage that maximizes luminosity factor. Therefore, it is possible to obtain a brighter projected image.

The projectors according to various embodiments have been described above. However, certain embodiments can be carried out in various forms without departing from the spirit of the invention. For example, modifications described below are also possible.

In at least one embodiment, as the liquid crystal light valve for red light, the liquid crystal light valve for green light, and the liquid crystal light valve for blue light, the liquid crystal light valves having liquid crystal panels of the TN type and the normally white system, respectively are used that are formed such that a wavelength region of light where light transmittance of the liquid crystal light valves is maximized in the voltage OFF state, in which no voltage is applied to the liquid crystal panels, is present in a wavelength region same as the wavelength region of the red light. However, the embodiment is not limited to this. For example, as the liquid crystal light valve for green light, a liquid crystal light valve may be used that is formed such that a wavelength region of light where light transmittance of the liquid crystal light valve is maximized in a voltage OFF state, in which no voltage is applied to a liquid crystal panel, is present in a wavelength region same as the wavelength region of green light. As the liquid crystal light valve for blue light, a liquid crystal light valve may be used that is formed such that a wavelength region of light where light transmittance of the liquid crystal light valve is maximized in a voltage OFF state, in which no voltage is applied to liquid crystal panels, is present in a wavelength region same as the wavelength region of blue light or the wavelength region of green light. However, in this case, at least two liquid crystal light valves among the plural liquid crystal light valves have the same structure. In the liquid crystal light valve that modulates light in a wavelength region shorter than a wavelength region of light where light transmittance of the liquid crystal light valve is maximized in the voltage OFF state, when a projector displays an image with highest luminance, a predetermined bias voltage is applied to a liquid crystal panel of the liquid crystal light valve to adjust the light transmittance of the liquid crystal light valve in the wavelength region of the light to be modulated such that the light transmittance is maximized.

In the second embodiment, as the liquid crystal light valve for red light, the liquid crystal light valve for green light, and the liquid crystal light valve for blue light, the liquid crystal light valves having liquid crystal panels of the VA type and the normally black system, respectively are used that are formed such that a wavelength region of light where light transmittance of the liquid crystal light valves is maximized in the voltage ON state in which the first voltage is applied to the liquid crystal panels, is present in a wavelength region same as the wavelength region of the red light. However, the embodiment is not limited to this. For example, as the liquid crystal light valve for green light, a liquid crystal light valve may be used that is formed such that light transmittance of the liquid crystal light valve is maximized in a voltage ON state, in which the first voltage is applied to a liquid crystal panel, is present in a wavelength region same as the wavelength region of green light. As the liquid crystal light valve for blue light, a liquid crystal light valve may be used that is formed such that a wavelength region of light where light transmittance of the liquid crystal light valve is maximized in a voltage ON state, in which the first voltage is applied to a liquid crystal panel, is present in a wavelength region same as the wavelength region of blue light or the wavelength region of green light. However, in this case, at least two liquid crystal light valves among the plural liquid crystal light valves have the same structure. In the liquid crystal light valve that modulates light in a wavelength region shorter than a wavelength region of light where light transmittance of the liquid crystal light valve is maximized in the voltage ON state, when a projector displays an image with highest luminance, the predetermined second voltage is applied to a liquid crystal panel of the liquid crystal light valve to adjust the light transmittance of the liquid crystal light valve in the wavelength region of the light to be modulated such that the light transmittance is maximized.

In the embodiments, as all of the liquid crystal light valve for red light, the liquid crystal light valve for green light, and the liquid crystal light valve for blue light, the liquid crystal light valves having the same structure are used. However, the embodiment is not limited to this. As two liquid crystal light valves among the three liquid crystal light valves, liquid crystal light valves having the same structure may be used.

In the examples described in the embodiments, the predetermined bias voltage applied by the voltage applying device or the predetermined second voltage applied by the liquid-crystal driving device is the voltage adjusted to maximize light transmittance of a liquid crystal light valve in a wavelength region where luminosity factor is maximized in color light modulated by the liquid crystal panel. However, the embodiment is not limited to this. The predetermined bias voltage or the predetermined second voltage may be a voltage adjusted to maximize light transmittance of a liquid crystal light valve in a wavelength region where a tristimulus value is maximized in color light modulated by the liquid crystal panel. Specifically, in a liquid crystal panel that modulates red light, the predetermined bias voltage or the predetermined second voltage is set to maximize light transmittance of a wavelength region where a tristimulus value X is maximized. In a liquid crystal panel that modulates green light, the predetermined bias voltage or the predetermined second voltage is set to maximize light transmittance of a wavelength region where a tristimulus value Y is maximized. In a liquid crystal panel that modulates blue light, the predetermined bias voltage or the predetermined second voltage is set to maximize light transmittance of a wavelength region where a tristimulus value Z is maximized. In all the cases, the predetermined bias voltage or the predetermined second voltage may be fine-tuned to make light transmittance of each of the color lights equal.

In the examples described in at least one embodiment, the liquid-crystal driving device and the voltage applying device are separately provided. However, the embodiment is not limited to this. For example, the liquid-crystal driving device and the voltage applying device are integrated and the integrated device has the function of applying the predetermined bias voltage.

In the embodiments, the secondary mirror is used as the reflecting means set to the arc tube. However, the embodiment is not limited to this. It is also preferable to use a reflective film as the reflecting means. In the embodiments, the projector in which the secondary mirror as the reflecting means is disposed in the arc tube is described as the example. However, the embodiment is not limited to this. It is also possible to apply the embodiment to a projector in which a secondary mirror is not disposed.

In the embodiments, the light source device including the elliptical surface reflector and the concave lens is used as the light source device. However, the embodiment is not limited to this. It is also preferable to use a light source device including a parabolic reflector.

In various embodiments, a lens integrator optical system including a lens array is used as a light equalizing optical system. However, the embodiment is not limited to this. It is also possible to preferably use a rod integrator optical system including a rod member.

In the embodiments, the projector is a transmissive projector. However, the embodiment is not limited to this. It is also possible to apply the embodiment to a reflective projector. "Transmissive" means that an electro-optic modulator as light modulating means is a type that transmits light like a transmissive liquid crystal device. "Reflective" means that an electro-optic modulator as light modulating means is a type that reflects light like a reflective liquid crystal device. Even when the embodiment is applied to the reflective projector, it is possible to obtain an effect same as that of the transmissive projector.

Specifically, there is a reflective liquid crystal light valve in which light from an illumination device is made incident from a light incidence and emission surface of a reflective liquid crystal panel, travels back and forth in a liquid crystal layer, and is emitted from the light incidence and emission surface and the emitted light is separated by a polarizer into light used as an image projected and light not projected. Even in such a reflective liquid crystal light valve, if the reflective liquid crystal light valve is normally white, it is possible to obtain an effect same as that of the transmissive liquid crystal light valve according to the embodiments by forming respective reflective liquid crystal panels to maximize luminance of light used as an image of color light in a wavelength region further on a long wavelength side among respective color lights in the voltage OFF state. If the reflective liquid crystal light valve is normally black, it is possible to obtain an effect same as that of the transmissive liquid crystal light valve according to the embodiments by forming respective reflective liquid crystal panels to maximize luminance of light used as an image of color light in a wavelength region further on a long wavelength side among respective color lights in the voltage ON state in which the predetermined first voltage is applied.

As the projector 1000 and 1002 according to the embodiments described above, the projector including the three liquid crystal light valves 400B, 400G, and 400R is described as an example. However, the embodiments are not limited to this. It is also possible to apply the embodiment to a projector including two or four or more liquid crystal light valves.

It is also possible to apply the embodiment to a front projection projector that projects a projection image from an observation side and to a rear projection projector that projects a projection image from a side opposite to the observation side.

Figure 9:
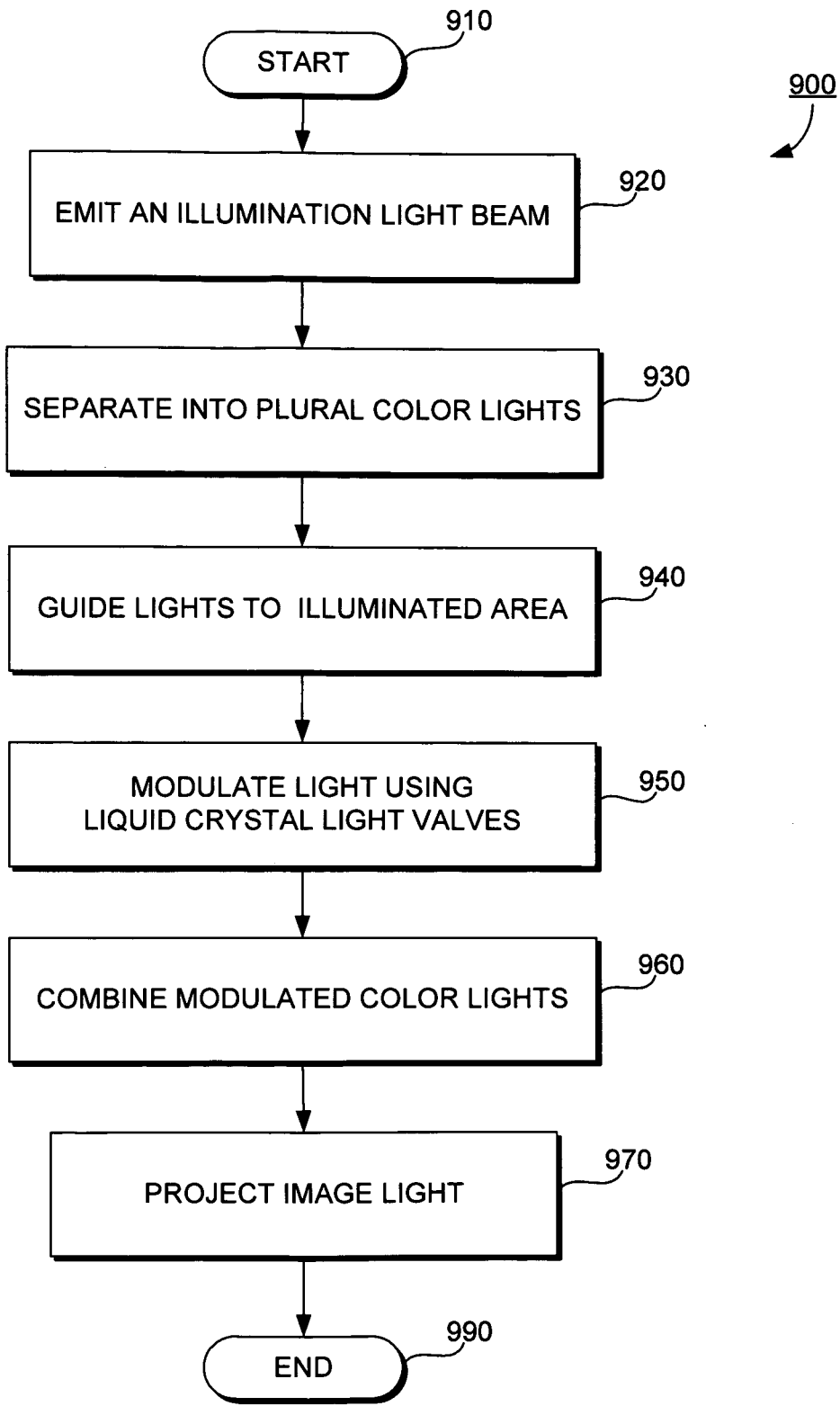
FIG. 9 is a flow diagram view of a process for projection using a plurality of liquid crystal light valves in accordance with various embodiments of the present disclosure.

Turning now to FIG. 9, a method or process of projection, in accordance with various embodiments, is described in terms of firmware, software, and/or hardware with reference to flow diagrams. Describing a method by reference to a flow diagram enables one skilled in the art to develop programs, including instructions to carry out the processes and methods on suitably configured projectors. In various embodiments, portions of the operations to be performed by a projection device may constitute circuits, filters, general purpose processors (e.g., micro-processors, micro-controllers, or digital signal processors), special purpose processors (e.g., application specific integrated circuits or ASICs), state machines, hardware arrays, reconfigurable hardware, and/or software made up of executable instructions. The executable instructions may be embodied in program code, firmware logic, reconfigurable logic, a hardware description language, a state machine, an application-specific integrated circuit (ASIC), or combinations thereof.

Referring now FIG. 9, a flow diagram view of a portion of a process 900 for projection by using one or a combination of the following techniques is shown. The process 900 is initiated on a projector in start block 910. In block 920 of the process 900, an illumination device on the projector is configured to emit an illumination light flux. The process 900 uses a color-separating optical system to separate light emitted from the illumination device into plural color lights in block 930. In block 940, the process 900 uses the color-separating optical system to direct the plural color lights to an illuminated area.

A plurality of liquid crystal light valves is used in block 950 of the process 900 to modulate the respective plural color lights in accordance with image information. As previously discussed, each of the plurality of liquid crystal light valves may be controlled by a liquid-crystal driving device configured to apply relative voltage in accordance with the image information to each liquid crystal light valve. The liquid-crystal driving device also is configured to apply designated voltage to each liquid crystal light valve to a wavelength region where light transmittance of the liquid crystal light valve is maximized, when an image with highest luminance is displayed by the projector. In one embodiment, the process 900 combines the respective color lights previously modulated by the plural liquid crystal light valves into image light using a color-combining optical system in block 960. The resulting image light may be projected in block 970 by a projection optical system. The projection process 900 is ended for the resulting image light in termination block 990. Although the operation of the projection process 900 has been described in a serial fashion, it is understood by those of skill in the art that the various steps of the process may be conducted in parallel on different portions of the signal to be projected.

Although certain embodiments have been illustrated and described herein for purposes of description of the preferred embodiment, it may be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A projector comprising:
an illumination device configured to emit an illumination light flux;
a color-separating optical system configured to separate light from the illumination device into plural color lights and configured to lead each of the separated plural color lights to an illuminated area;
plural liquid crystal light valves having liquid crystal panels of a TN type and a normally white system and emission-side polarizers arranged on light emission sides of the liquid crystal panels, each of the plural liquid crystal light valves:
configured to modulate one of the respective plural color lights received from the color-separating optical system in accordance with image information, and
configured such that a light transmittance, in a wavelength region, of the liquid crystal light valve is maximized in a voltage OFF state when no driving voltage is applied to the liquid crystal panel, the wavelength region being located in at least one of: (a) a color light wavelength region having a wavelength of the color light modulated by the liquid crystal light valve, and (b) a long wavelength region having a wavelength greater than the color light wavelength region;
a color-combining optical system configured to combine the respective plural color lights modulated by the plural liquid crystal light valves into image light;
a projection optical system configured to project the image light;
a liquid-crystal driving device configured to control the plural liquid crystal light valves; and
a voltage applying device configured to apply, when the projector displays an image with a highest luminance, a predetermined bias voltage to at least one of the liquid crystal panels so that the light transmittance of the color light modulated by the corresponding liquid crystal light valve draws closer to the maximum, the predetermined bias voltage being different from a voltage applied, when the projector displays an image with a highest luminance, to another one of the liquid crystal panels.

2. The projector according to claim 1, wherein the plural liquid crystal light valves are configured so that the wavelength region for each of the liquid crystal valves is located in the color light wavelength region of the color light having the largest wavelength from among the plural color lights.

3. The projector according to claim 1, wherein at least two of the plural liquid crystal light valves have the same structure.

4. The projector according to claim 1, wherein the predetermined bias voltage is a voltage selected so that the light transmittance in a wavelength region where a luminosity factor is maximum is the maximum.

5. The projector according to claim 1, wherein the predetermined bias voltage is a voltage selected so that the light transmittance in a wavelength region where a tristimulus value is maximum is the maximum.

6. A projector comprising:
an illumination device configured to emit an illumination light flux;
a color-separating optical system configured to separate light from the illumination device into plural color lights and configured to lead each of the separated plural color lights to an illuminated area;
plural liquid crystal light valves having liquid crystal panels of a VA type and a normally black system and emission-side polarizers arranged on light emission sides of the liquid crystal panels, each of the plural liquid crystal light valves:
configured to modulate the one of the respective plural color lights received from the color-separating optical system in accordance with image information, and
configured such that a light transmittance, in a wavelength region, of the liquid crystal light valve is maximized in a voltage ON state when a predetermined first voltage is applied to the liquid crystal panel, the wavelength region being located in at least one of: (a) a color light wavelength region having a wavelength of the color light modulated by the liquid crystal light valve, and (b) a long wavelength region having a wavelength greater than the color light wavelength region;
a color-combining optical system configured to combine the respective plural color lights modulated by the plural liquid crystal light valves into image light;
a projection optical system configured to project the image light; and
a liquid-crystal driving device configured to control the plural liquid crystal light valves, wherein the liquid-crystal driving device is configured to apply, a predetermined second voltage lower than the predetermined first voltage to at least one of the liquid crystal panels when the projector displays an image with a highest luminance so that the light transmittance of the color light modulated by the corresponding liquid crystal light valve draws closer to the maximum, the predetermined second voltage being different from a voltage applied to another one of the liquid crystal panels when the projector displays an image with a highest luminance.

7. The projector according to claim 6, wherein the plural liquid crystal light valves are configured so that the wavelength region for each of the liquid crystal valves is located in the color light wavelength region of the color light having the largest wavelength among the plural color lights.

8. The projector according to claim 6, wherein at least two of the plural liquid crystal light valves have the same structure.

9. The projector according to claim 6, wherein the predetermined second voltage is a voltage selected so that the light transmittance in a wavelength region where a luminosity factor is maximum is the maximum.

10. The projector according to claim 6, wherein the predetermined second voltage is a voltage selected so that the light transmittance in a wavelength region where a tristimulus value is maximum is the maximum.

11. A method of projection, comprising:
emitting by an illumination device an illumination light flux;
separating by a color-separating optical system light emitted from the illumination device into plural color lights;
leading by the color-separating optical system each of the plural color lights to an illuminated area;
modulating by a plurality of liquid crystal light valves the respective plural color lights in accordance with image information, the plurality of liquid crystal light valves including liquid crystal panels of a TN type and a normally white system and emission-side polarizers arranged on light emission sides of the liquid crystal panel;

combining by a color-combining optical system the respective color lights modulated by the plural liquid crystal light valves;

projecting by a projection optical system image light combined by the color-combining optical system;

controlling by a liquid-crystal driving device the plural liquid crystal light valves, such that a light transmittance, in a wavelength region, of the liquid crystal light valve is maximized when no voltage is applied to the liquid crystal panel, the wavelength region being located in at least one of: (a) a color light wavelength region having a wavelength of the color light modulated by the corresponding liquid crystal light valve, and (b) a long wavelength region having a wavelength greater than the color light wavelength region; and applying, when the projector displays an image with a highest luminance, a predetermined bias voltage to at least one of the liquid crystal panels of the liquid crystal light valve by a voltage applying device such that a light transmittance in the wavelength region of color light modulated by the corresponding liquid crystal light valve is maximized, the predetermined bias voltage being different from a voltage applied, when the projector displays an image with a highest luminance, to another one of the liquid crystal panels.

12. A method of projection, comprising:

emitting by an illumination device an illumination light flux;

separating by a color-separating optical system light emitted from the illumination device into plural color lights;

leading by the color-separating optical system each of the plural color lights to an illuminated area;

modulating by a plurality of liquid crystal light valves the respective plural color lights in accordance with image information, the plural liquid crystal light valves include liquid crystal panels of a VA type and a normally black system and emission-side polarizers arranged on light emission sides of the liquid crystal panels;

combining by a color-combining optical system the respective color lights modulated by the plural liquid crystal light valves;

projecting by a projection optical system image light combined by the color-combining optical system;

controlling by a liquid-crystal driving device the plural liquid crystal light valves, such that a light transmittance, in a wavelength region, of the liquid crystal light valve is maximized when a predetermined first voltage is applied to the liquid crystal panel, the wavelength region being located in at least one of: (a) a color light wavelength region having a wavelength of the color light modulated by the corresponding liquid crystal light valve, and (b) a long wavelength region having a wavelength greater than the color light wavelength region; and controlling by the liquid-crystal driving device the plural liquid crystal light valves to apply, when the projector displays an image with a highest luminance, a predetermined second voltage lower than the predetermined first voltage to at least one of the liquid crystal panels such that a light transmittance in the wavelength region of color light modulated by the corresponding liquid crystal light valve is maximized, the predetermined second voltage being different from a voltage applied to another one of the liquid crystal panels when the projector displays an image with a highest luminance.

* * * * *